US010637740B2

(12) United States Patent
Pfeffer

(10) Patent No.: US 10,637,740 B2
(45) Date of Patent: Apr. 28, 2020

(54) APPARATUS AND METHODS FOR MANAGEMENT, CONFIGURATION AND PROVISIONING OF COMMUNICATION DEVICES IN A DISTRIBUTED ACCESS ARCHITECTURE

(71) Applicant: Howard Pfeffer, Reston, VA (US)

(72) Inventor: Howard Pfeffer, Reston, VA (US)

( * ) Notice: Subject to any disclaimer, the term of this patent is extended or adjusted under 35 U.S.C. 154(b) by 118 days.

(21) Appl. No.: 16/020,887

(22) Filed: Jun. 27, 2018

(65) Prior Publication Data
US 2019/0036785 A1 Jan. 31, 2019

Related U.S. Application Data

(60) Provisional application No. 62/529,881, filed on Jul. 7, 2017.

(51) Int. Cl.
H04L 12/24 (2006.01)
H04L 12/911 (2013.01)

(52) U.S. Cl.
CPC .......... H04L 41/12 (2013.01); H04L 41/0803 (2013.01); H04L 41/0806 (2013.01);
(Continued)

(58) Field of Classification Search
CPC .............. H04L 41/0803; H04L 41/0806; H04L 41/0813; H04L 41/0816; H04L 41/082;
(Continued)

(56) References Cited

U.S. PATENT DOCUMENTS 7,246,366 B1 * 7/2007 Addington ............. H04N 7/165
348/E7.063
7,707,615 B2 * 4/2010 Musser ................... H04L 1/243
725/107

(Continued)

OTHER PUBLICATIONS

CableLabs "Data-Over-Cable Service Interface Specifications, DCA, Distributed CCAP Architectures Overview Technical Report, CM-TR-DCA-V01-150908", Sep. 8, 2015.
(Continued)

Primary Examiner — Greg C Bengzon
(74) Attorney, Agent, or Firm — Gazdzinski & Associates, P.C.

(57) ABSTRACT

Apparatus and methods for configuration of a Remote PHY or Communications Device, and redirection one or more core device(s) within a content and data delivery network. In one embodiment, the architecture comprises a Remote PHY distributed CCAP architecture within a cable network, and the methods and apparatus provide a network operator with the ability to associate multiple remote devices (and their associated service groups, and hence subscribers) to one or more specific CCAP core(s), to facilitate the operator's operational and support models, including defining and instantiating an overall network topology. In one exemplary variant, information from multiple sources are used by an analytics engine to calculate remote device-to-core assignments, so as to achieve the desired overall operational topology and goals. Improved mechanisms for remote device installation are described. In one implementation, mobile devices are used by installers to interact with the assignment process logic.

15 Claims, 17 Drawing Sheets

(52) U.S. Cl.
CPC ........ *H04L 41/0823* (2013.01); *H04L 41/145* (2013.01); *H04L 47/783* (2013.01)

(58) Field of Classification Search
CPC ............... H04L 41/0823; H04L 41/085; H04L 41/0853; H04L 41/0859; H04L 41/0866; H04L 41/0873; H04L 41/0869; H04L 41/12; H04L 41/14; H04L 41/5054; H04L 41/5058; H04L 41/145; H04L 47/783; H04L 41/0876; H04L 41/0883; H04L 41/0886; H04L 41/0889; H04L 41/0893; H04L 45/58; H04L 45/583; H04L 45/586; H04L 67/1025; H04L 67/1029; H04L 67/289; H04L 67/32; H04L 67/34; H04L 12/2801; H04L 41/509; H04N 21/6118; H04N 21/2221; H04N 21/25816; H04N 21/6168; H04N 21/64322; H04N 21/64707; H04N 21/6338; H04N 21/6547

See application file for complete search history.

(56) References Cited

U.S. PATENT DOCUMENTS

| | | | | |
|---|---|---|---|---|
| 7,831,989 | B1* | 11/2010 | Calzone | H04L 12/2801 370/428 |
| 8,634,821 | B2* | 1/2014 | Raleigh | H04M 15/61 455/419 |
| 8,935,739 | B1* | 1/2015 | Rakib | H04N 21/2221 370/229 |
| 9,066,153 | B2* | 6/2015 | Pfeffer | H04N 21/64322 |
| 9,191,113 | B1* | 11/2015 | Rakib | H04N 21/6118 |
| 9,294,393 | B1* | 3/2016 | Mullooly | H04L 41/12 |
| 9,344,769 | B1* | 5/2016 | Rakib | H04B 10/25751 |
| 9,854,283 | B2* | 12/2017 | Rakib | H04N 7/10 |
| 9,985,875 | B1* | 5/2018 | Srinath | G06F 11/1451 |
| 10,148,506 | B1* | 12/2018 | Anburose | H04L 41/5006 |
| 10,390,058 | B2* | 8/2019 | Karnik | H04N 21/6371 |
| 10,404,585 | B1* | 9/2019 | Bonen | H04L 45/70 |
| 2001/0055319 | A1* | 12/2001 | Quigley | H04J 3/1694 370/480 |
| 2002/0056128 | A1* | 5/2002 | Makipaa | H04N 7/17309 725/98 |
| 2002/0116721 | A1* | 8/2002 | Dobes | H04L 12/2856 725/129 |
| 2005/0212504 | A1* | 9/2005 | Revital | H04H 20/76 324/100 |
| 2007/0115962 | A1* | 5/2007 | Mammoliti | H04L 41/0806 370/389 |
| 2008/0056130 | A1* | 3/2008 | Desai | H04L 12/2801 370/231 |
| 2010/0154017 | A1* | 6/2010 | An | H04L 12/2801 725/111 |
| 2010/0303092 | A1* | 12/2010 | Chinnaswamy | H04L 41/0806 370/465 |
| 2010/0309805 | A1* | 12/2010 | Jones, Jr. | H04L 12/2801 370/252 |
| 2010/0318686 | A1* | 12/2010 | Ver Steeg | H04L 12/66 710/8 |
| 2011/0154424 | A1* | 6/2011 | Lee | H04L 12/2801 725/110 |
| 2011/0265116 | A1* | 10/2011 | Stern | H04L 12/2801 725/35 |
| 2011/0269421 | A1* | 11/2011 | Moore | H04L 12/14 455/406 |
| 2012/0076015 | A1* | 3/2012 | Pfeffer | H04L 12/2801 370/252 |
| 2012/0213259 | A1* | 8/2012 | Renken | H04N 7/17309 375/222 |
| 2012/0250504 | A1* | 10/2012 | Finkelstein | H04L 12/2801 370/230 |
| 2012/0251113 | A1* | 10/2012 | Hajduczenia | H04L 41/082 398/66 |
| 2013/0070640 | A1* | 3/2013 | Chapman | H04L 12/2801 370/254 |
| 2013/0077634 | A1* | 3/2013 | Finkelstein | H04L 65/1026 370/401 |
| 2013/0125194 | A1* | 5/2013 | Finkelstein | H04L 12/2801 725/129 |
| 2013/0291034 | A1* | 10/2013 | Basile | H04N 17/004 725/107 |
| 2013/0322504 | A1* | 12/2013 | Asati | H04L 41/0853 375/224 |
| 2014/0079102 | A1* | 3/2014 | Kliger | H04L 5/0046 375/222 |
| 2014/0101711 | A1* | 4/2014 | Rakib | H04N 21/6118 725/129 |
| 2014/0123203 | A1* | 5/2014 | Oliver | H04N 7/102 725/125 |
| 2014/0150047 | A1* | 5/2014 | Rakib | H04N 21/6118 725/129 |
| 2014/0215051 | A1* | 7/2014 | Schlack | H04L 43/0817 709/224 |
| 2014/0278273 | A1* | 9/2014 | Bowler | H04L 41/12 703/1 |
| 2015/0052572 | A1* | 2/2015 | Schemmann | H04L 12/2801 725/116 |
| 2015/0146721 | A1* | 5/2015 | Aaby | H04N 21/6118 370/390 |
| 2015/0172072 | A1* | 6/2015 | Rakib | H04L 12/2885 725/111 |
| 2015/0188822 | A1* | 7/2015 | Frieh | H04B 3/02 370/235 |
| 2015/0222449 | A1* | 8/2015 | Salinger | H04L 12/2801 370/419 |
| 2015/0270988 | A1* | 9/2015 | Finkelstein | H04L 12/66 370/401 |
| 2015/0295746 | A1* | 10/2015 | Chapman | H04L 5/0007 375/257 |
| 2016/0050125 | A1* | 2/2016 | Mattson | H04L 41/5051 709/225 |
| 2016/0294611 | A1* | 10/2016 | Khambatkone | H04L 41/0803 |
| 2016/0295252 | A1* | 10/2016 | Karnik | H04N 21/2221 |
| 2016/0366022 | A1* | 12/2016 | Finkelstein | H04L 41/12 |
| 2017/0093623 | A1* | 3/2017 | Zheng | H04L 63/0892 |
| 2017/0244577 | A1* | 8/2017 | Patrick | H04L 12/2801 |
| 2017/0331554 | A1* | 11/2017 | Ke | H04B 10/25 |
| 2017/0346740 | A1* | 11/2017 | Brewer | H04L 47/15 |
| 2017/0353750 | A1* | 12/2017 | Gotwals | H04N 21/2408 |
| 2018/0062932 | A1* | 3/2018 | Cohn | H04L 41/12 |
| 2018/0139096 | A1* | 5/2018 | Lee | H04L 41/0893 |
| 2018/0175996 | A1* | 6/2018 | Jia | H04N 21/6168 |
| 2018/0234298 | A1* | 8/2018 | Cohn | H04L 41/12 |
| 2018/0294837 | A1* | 10/2018 | Chapman | H04L 12/2801 |
| 2018/0331885 | A1* | 11/2018 | Raymond | H04L 47/76 |
| 2018/0351882 | A1* | 12/2018 | Jeganathan | H04L 45/02 |
| 2018/0367421 | A1* | 12/2018 | Cloonan | H04L 41/5067 |
| 2019/0036796 | A1* | 1/2019 | Xu | H04L 12/2801 |
| 2019/0165997 | A1* | 5/2019 | Shaikh | H04L 41/0806 |
| 2019/0166013 | A1* | 5/2019 | Shaikh | H04L 41/50 |
| 2019/0166037 | A1* | 5/2019 | Shaikh | H04L 41/08 |
| 2019/0173750 | A1* | 6/2019 | Shaikh | H04L 63/20 |
| 2019/0238361 | A1* | 8/2019 | Shen | H04L 12/2861 |
| 2019/0273953 | A1* | 9/2019 | Hasek | H04N 21/2396 |
| 2019/0296998 | A1* | 9/2019 | Shaikh | H04L 41/042 |

OTHER PUBLICATIONS

CableLabs "*Data-Over-Cable Service Interface Specifications, DCA-MHAv2, Generic control Plane Specification*, CM-SP-GCP-I02-160512", May 12, 2016.

CableLabs "*Data-Over-Cable Service Interface Specifications, DCA-MHAv2, Remote PHY Specification*, CM-SP-R-PHY-I06-170111", Jan. 11, 2017.

* cited by examiner

APPARATUS AND METHODS FOR MANAGEMENT, CONFIGURATION AND PROVISIONING OF COMMUNICATION DEVICES IN A DISTRIBUTED ACCESS ARCHITECTURE

PRIORITY

This application claims priority to U.S. Provisional Patent Application Ser. No. 62/529,881 entitled "APPARATUS AND METHODS FOR MANAGEMENT, CONFIGURATION AND PROVISIONING OF COMMUNICATION DEVICES IN A DISTRIBUTED ACCESS ARCHITECTURE" filed Jul. 7, 2017, and incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless devices, and specifically in one exemplary aspect to an architecture which integrates or unifies provision of high-speed data services in a variety of different locations and use cases.

2. Description of Related Technology

The continued growth of Internet traffic has driven Cable operators to evolve their network architectures and data service technologies. Hybrid Fiber-coaxial (HFC) is the physical layer architecture for Cable operators, and the Data Over Cable Services Interface Specification (DOCSIS) standard is the primary technology used by Cable operators to transfer data over HFC.

As the name implies, an HFC network 100 combines fiber optical cables and coaxial cables to distribute signals between the MSO (e.g., cable) operator's facilities and the subscriber's location as shown in FIG. 1. Specifically, electrical signals (e.g. TV channels or Internet traffic) generated or issued by the headend 102 are converted into optical signals (light) at one or more distribution hub facilities 104, sent over the fiber optical cables 106 to optical nodes 108, which then convert the light signals back to the electrical signals, and send them over the coaxial cables 110 to the user's or subscriber's location or premises 112. At the subscriber's location the electrical signals are received by Customer Premise Equipment (CPE) such as Set-top Boxes (STB) or Cable Modems (CM) or gateways. For two-way services, such as Internet access, the process is reversed for upstream signals (i.e. signals from the subscriber to the operator's facilities). One major advantage of HFC is that signals can be sent much longer distances over the optical fiber cables 106 without regeneration/amplification, as compared to coaxial cables 110. The evolution from a pure coaxial architecture to an HFC architecture allowed, inter alia, cable operators to increase their service area while limiting the number of distribution hub facilities.

DOCSIS and CCAP

The DOCSIS standards specify the systems and mechanisms used to distribute data services over HFC. As used herein, the term "DOCSIS" refers to any of the existing or planned variants of the Data Over Cable Services Interface Specification, including for example DOCSIS versions 1.0, 1.1, 2.0, 3.0 and 3.1. Initial versions of DOCSIS specified two primary systems—the Cable Modem Termination Subsystem (CMTS) and the Cable Modem (CM), not shown. The CMTS is typical located a distribution hub 104 and is responsible for data communications between the CM at a user's or subscriber's location (e.g. their home) 112 and a data service (e.g. Internet access). The CMTS converts data packets between the data service located on the transport ring/network and the corresponding signals distributed over the HFC network 100. The CM converts data packets between subscriber's Local Area Network (LAN) and the corresponding signals distributed over the HFC network.

For example, packets from the Internet data service can enter the transport ring 103 via a Router, arrive at CMTS which converts/modulates them into appropriate signals for transmission over the HFC network. The signals are received by a CM at the subscriber's location, converted/demodulated back into packets and sent to the subscriber's device, e.g., attached to their LAN. Later version of the DOCSIS standard include digital video support into the CMTS and creation of a new platform commonly known as the Converged Cable Access Platform (CCAP), as described in later detail subsequently herein.

There are several mechanisms employed by MSOs such as Cable Operators to increase capacity of their data services. As used herein, the terms "MSO" or "multiple systems operator" refer to a cable, satellite, or terrestrial network provider having infrastructure required to deliver services including programming and data over those mediums. These mechanisms include, but are not limited to: segmentation, spectrum upgrades, spectrum planning/allocations, and spectral efficiency.

Segmentation broadly involves adding more optical nodes 108, which in-turn decrease the number of subscribers or users sharing the capacity on a given segment of the HFC network. Segmentation (sometime called "node-splits") typical requires the operator to deploy fiber cables deeper into their service, so that the added optical nodes can be located closer to the users/sub scribers.

Transmission of signals over HFC employees Frequency Division Multiplexing (FDM). The total available Radio Frequency (RF) spectrum defines the total capacity for a given segment. By upgrading HFC transmission technology (lasers, amplifiers, taps, CPE, etc.), operators can increase the total available RF spectrum and hence the total available capacity. For example, with the latest transmission technology, operators can achieve 1.2 GHz of spectrum, broader than the historical roughly 800 MHz of usable spectrum under typical prior cable systems.

The data capacity derived from the available RF spectrum depends on, among other things, the modulation techniques and noise mitigation capabilities of the transmission technology. The amount of information that can be transmitted using a given amount of spectrum is often referred to as "spectral efficiency," and is typical measured in data bits/Hz. DOCSIS has continued to increase its spectral efficiency by adopting new modulation techniques such as OFDM and new error correction mechanisms, namely LDPC.

While the foregoing techniques have allowed operators to scale extant capacity, the current HFC and DOCSIS architectures present a set of challenges to further increases. For example, segmentation will drive a significant increase in the number of CMTS/CCAP devices, which will eventually exhaust the space, power and HVAC capacity of the distribution facilities. Moreover, HFC employees Amplitude Modulation (AM) of lasers to transmit the RF spectrum signals over the fiber optical cables (after conversion to the optical domain). This is typical referred to as "analog optics." The inherent transmission characteristics of analog optics (e.g. signal-to-noise, path loss, etc.) limit the ability to increase spectral efficiency. Yet other limitations are present.

In response to these challenges a new DOCSIS architecture has been developed called the Distributed Access Architecture (DAA). The Distributed Access Architecture (DAA) replaces the analog optics between the aforementioned CMTS/CCAP devices and the optical nodes 108 with "digital optics" that use baseband transmission such as Ethernet. Furthermore, DAA moves some of the DOCSIS function to the optical node 108. The current version of the DOCSIS specification also moves the PHY layer (including modulation/demodulation to a new node referred to as a "Remote PHY Device" (RPD). See, inter alia, CableLabs "*Data-Over-Cable Service Interface Specifications DCA Distributed CCAP Architectures Overview Technical Report CM-TR-DCA-V01-150908*," incorporated herein by reference in its entirety. In this architecture, the centralized CCAP/CMTS functionality has been replace by a CCAP Core or Controller in the "distributed" portion of the architecture, depending on the architecture variant selected (e.g., Remote MAC+PHY, Split-MAC, or Remote PHY). One consequence of this approach is that non-remote CCAP/CMTS functions can implemented as software functions in e.g., a virtualized computing platform.

RPD Initialization Process

During the RPD initialization process, the RPD and other system/network elements execute a series of steps after RPD power-up, thereby enabling the RPD to become fully operational. As shown in the example architecture of FIG. 2, in addition to normal DOCSIS signaling between the CCAP Core 202 and the relevant cable modem(s) 206, the RPD 204 and a given CCAP Core 202 communicate via three different protocols 203, namely:

(i) R-DEPI (Remote Downstream External PHY Interface)—This interface handles downstream communications between the given CCAP Core and the RPD. Per Cable Labs, it is characterized as an "IP pseudowire" between the MAC and PHY in an MHAv2 system that comprises both a data path for DOCSIS data frames, video data packets, and OOB (out of band) packets, as well as a session control path. MHAv2 retains the original MPT (MPEG-TS) encapsulation of MHAv1 (for backward compatibility), but also utilizes MPEG encapsulation (MCM or Multi-channel MPEG). MHAv2 also requires support of a PSP (Packet Streaming Protocol) mode, such as to support expansion of services under DOCSIS 3.1.

(ii) R-UEPI (Remote Upstream External PHY Interface)—This interface supports upstream communications between the RPD and the CCAP Core. As with R-DEPI, it is referred to as an IP pseudowire between the PHY and MAC within an MHAv2 system that provides a data path for DOCSIS frames, as well as a control path for communication sessions.

(iii) The GCP (Generic Control Plane)—The Generic Control Plane is described in the Cable Labs Specification, CM-SP-GCP-I02-160512, May 12, 2016, (and any subsequent versions) incorporated herein by reference in its entirety. Per CM-SP-GCP-I02-160512, the GCP provides a control plane "tunnel" over a generic, reliable transport protocol such as TCP. GCP in effect mimics functionality that exists over a hardware bus (e.g., between a digital CPU and a peripheral interface IC), and can access register or use higher layer data structures to effect data read/write operations. Functions controlled via GCP include device reset, power-up/power-down, and hardware interrupts. As such, GCP allows ICs or other embedded entities to communicate across a network interface such as an Ethernet (IEEE Std. 802.3) PHY.

Solutions Needed

In the traditional integrated CCAP architecture discussed above, the DOCSIS network topology (MAC domain or service group) is mapped to an HFC service group when the integrated CCAP ports (downstream and upstream) are wired to the Optical HFC Nodes servicing a particular geographic area. This mapping binds all the physical network elements (e.g. CCAP/CMTS, cable modems, outside plant, HFC amplifiers, etc.) and logical networks (e.g., DOCSIS MAC domains) into an overall network topology that supports subscribers in that specific geographic area (i.e., a service group). Cable system operations and support is heavily dependent on the ability to link a subscriber or set of subscribers of an operator's HFC network to the physical and logical elements. For example, if a subscriber or group of subscribers in given service group is having a network-related problem (as opposed to for example issues with their particular CPE), the network operator needs to be able to identify all of the physical and logical elements in the path for service delivery to the affected subscriber(s). Conversely, if the operator is making a change to a physical or logical element, it is desirous to be able to identify all the subscribers and/or other elements in the service delivery path, so that the operator may proactively plan, support and communicate any service delivery impacts.

In a CCAP "Remote PHY" Distributed Access Architecture, a new and different set of logical and physical elements exists within the path for services delivery. An RPD is physically wired to a service group (effectively becoming the aforementioned "optical node" counterpart), and connected to an IP network for communications with one or more CCAP Cores. The association of RPDs to CCAP Cores is logical; the CCAP Core(s) merely see an RPD as an IP device (a trusted device) attached over the IP network. Furthermore, CCAP Cores can exist as virtualized software elements running in any one of a multitude of data centers connected to the IP network.

Accordingly, such new remote or "distributed" architectures result in a broad spectrum of new logical and physical network topologies used for service delivery as compared to prior art technology. Despite the foregoing extant CCAP capabilities and interfaces, control and configuration of each particular RPD within such new remote or distributed architectures, the complexity of instantiating an overall network topology that implements the prescribed operator operational and support model is greatly increased, and further is prone to any number of different errors, due to the many possible combinations or permutations of the distributed elements, including both physically and logically.

Yet further, the installation of such distributed topology components such as RPDs can involve a manual process, and may encounter issues during installation requiring resolution by the installer.

SUMMARY

The present disclosure addresses the foregoing needs by providing, inter alia, methods and apparatus for management, configuration and provisioning of communication devices in a distributed access architecture, including for network component assignment and redirection/reassignment.

In a first aspect of the disclosure, a method of operating a distributed network is described. In one embodiment, the method includes: identifying at least one remote entity, the at least one remote entity comprising physical layer (PHY) apparatus for communication with one or more user devices; obtaining data from the at least one remote entity; providing the obtained data to a computerized analytics process; based at least on (i) the provided obtained data, and (ii) data relating to one or more network operational policies, calculating an allocation of the at least one remote entity to at least one core entity within the distributed architecture network; and based at least on the calculated allocation, causing the at least one remote entity to associate with the at least one core entity during operation of the distributed architecture network.

In another aspect, a method of processing an initialization request within a core entity of a distributed architecture digital network is disclosed. In one embodiment, the method includes: receiving an initialization message from a remote device within the distributed architecture digital network; authenticating at least the remote device; establishing a communication interface between the remote device and the core entity; determining a first status of the remote device; based on the determination of the first status, causing the remote device to use the core entity as its operational core; notifying an installation process of the availability of the remote device for configuration; receiving data from the installation process relating to the configuration of the remote device; using the received data to remotely configure the remote device; designate the remote device as available for redirection to another core entity within the network; and causing re-initialization of the remote device, the re-initialization causing the remote device to utilize the another core entity as its operational core.

In another aspect of the disclosure, a CCAP Core apparatus is disclosed. In one embodiment, the CCAP Core apparatus includes an enhanced Core (eCore) configured to selectively utilize analyses by a network analytics process to determine optimized device allocations within a desired network topology or performance framework.

In another aspect of the disclosure, a CCAP RPD apparatus is disclosed. In one embodiment, the CCAP RPD apparatus includes an enhanced RPD (eRPD) configured to selectively provide data to one or more Core entities and/or network analytic processes, and to receive configuration data from one or more of the Core entities, to enable optimized assignment of the eRPD within the network topology.

In a further aspect of the disclosure, a distributed architecture network system is disclosed. In one embodiment, the system includes: (i) one or more eCore apparatus, and (ii) one or more eRPD apparatus in data communication with at least one of the eCore apparatus.

In a further aspect, a configuration, reconfiguration and assignment protocol is disclosed. In one embodiment, the protocol is adapted for use in a CCAP-enabled distributed network, and includes data communications between one or more eRPDs, eCores, and an analytics engine to communicate data relevant to assignment/re-assignment of eRPDs to one or more eCores. In one variant, the protocol implements a GCP (generic control plane) interface modified to include data relating to the one or more eRPDs (e.g., to write data such as a Device Alias value into a target RPD).

In another aspect, an analytics engine is disclosed. In one embodiment, the analytics engine comprises a computerized process operable to run on one or more network entities (e.g., one or more head-end servers, or distributed entities such as CCAP eCores) and to analyze data relating to RPDs within the network, and specified operational policies and requirements, to determine optimized RPD-to-Core allocations.

In a further aspect, a computer-readable apparatus is disclosed. In one embodiment, the apparatus includes a storage medium having at least one computer program disposed thereon in the form of a plurality of computer-executable instructions. In one variant, the apparatus is a hard disk drive (HDD). In another variant, the apparatus is a solid state device (SSD). In another variant, the apparatus comprises a program memory device.

In another aspect of the disclosure, computerized logic for implementing selective remote device configuration and assignment is disclosed. In one embodiment, the logic is embodied as software (e.g., one or more computer programs). In another embodiment, the logic is embodied as firmware. In another embodiment, the logic is embodied as part of a FPGA or other gate array. In yet another embodiment, the logic is embodied as part of an application-specific IC (ASIC).

These and other aspects shall become apparent when considered in light of the disclosure provided herein.

BRIEF DESCRIPTION OF THE DRAWINGS

FIGS. 3 and 7-16 © Copyright 2017-2018 Howard Pfeffer. All rights reserved. All other figures Copyright © of their respective copyright holders.

DETAILED DESCRIPTION

Figure 1:
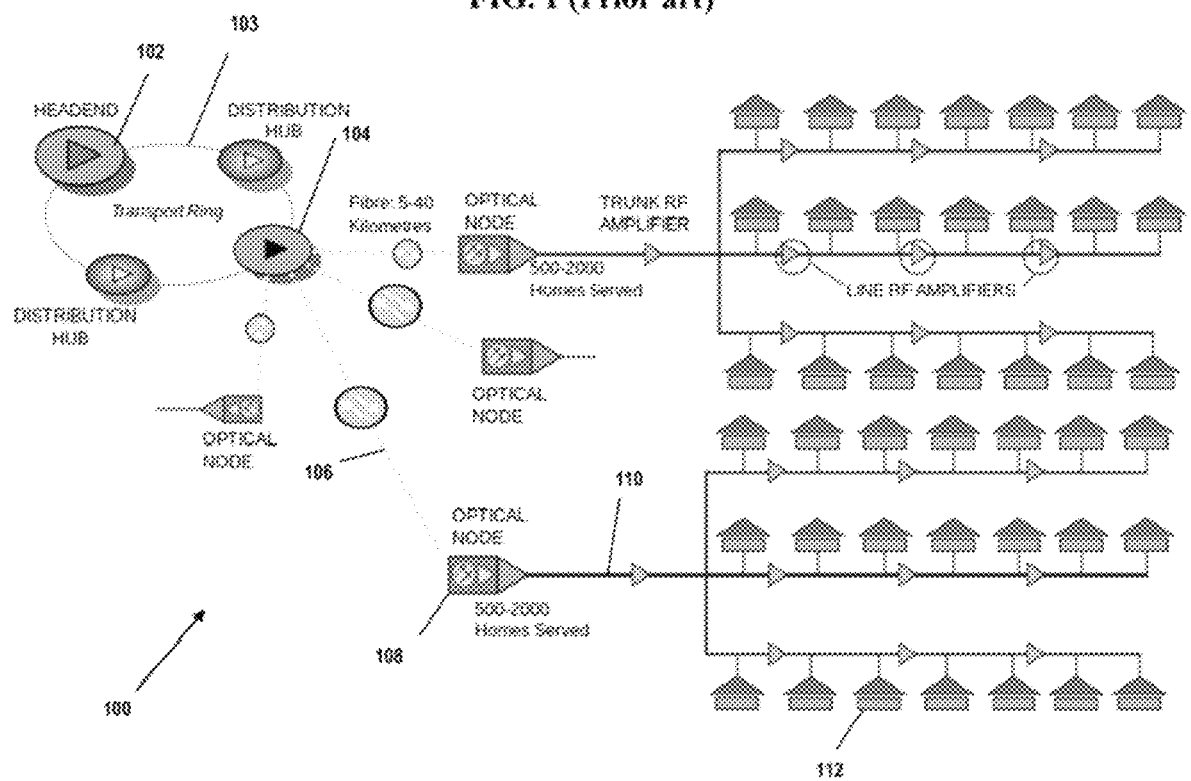
FIG. 1 is a block diagram illustrating an exemplary prior art hybrid fiber (HFC) network configuration.
Figure 2:
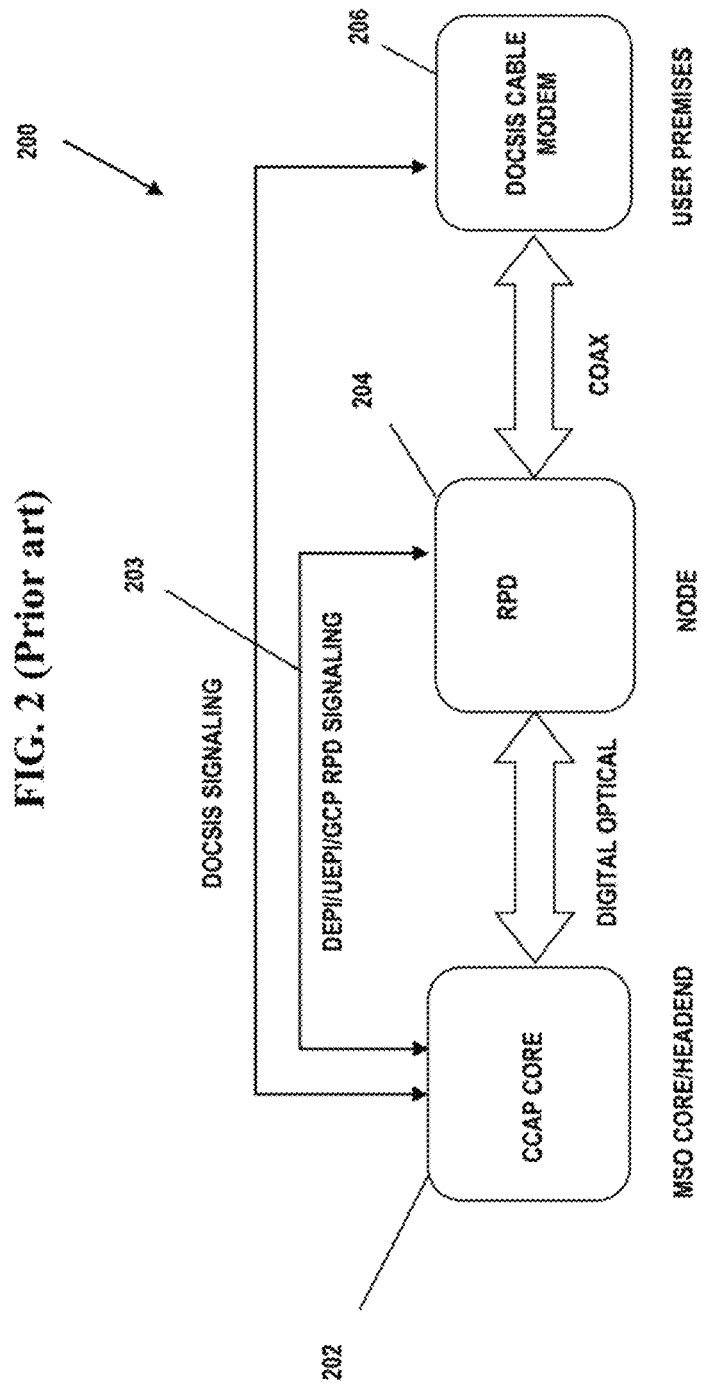
FIG. 2 is a block diagram illustrating an exemplary prior art CCAP-based architecture for use in the HFC network of FIG. 1.

Reference is now made to the drawings wherein like numerals refer to like parts throughout.

As used herein, the term "application" and "application computer program" refer generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" and 'WLAN" refers to, without limitation, any of the variants of IEEE-Std. 802.11 or related standards including 802.11a/b/g/n/s/v/ac or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

The present disclosure comprises, inter alia, a set of systems, apparatus, and methodologies to configure an RPD (or a Remote Communications Device) and redirect it to another CCAP Core/s based on a set of rules and data.

Specifically, under an exemplary Remote PHY distributed architecture, it is desirous for a network operator to have the ability to associate multiple RPDs (and their associated service groups, and hence subscribers) to one or more specific CCAP Core(s) or set of Cores, in order to facilitate the operator's operational and support models (including defining and instantiating an overall network topology, with all of the physical and logical elements in the path(s) of service delivery). The various aspects of the present disclosure advantageously provide such capabilities, including via enhanced CCAP Cores (eCores) and RPDs (eRPDS), as well as an analytics engine.

In one exemplary embodiment, information from multiple sources (the RPDs/eRPDs and CCAP Cores/eCores within the network, external systems and an installer) are used by the analytics engine to calculate RPD/eRPD-to-Core/eCore assignments, so as to achieve the desired overall operational topology and goals. In addition to the topology configuration analytics engine, improved mechanisms for RPD/eRPD installation are described. In one implementation, mobile devices are used by installers to interact with the assignment process logic.

Detailed Description of Exemplary Embodiments

Exemplary embodiments of the apparatus and methods of the present disclosure are now described in detail. While these exemplary embodiments are described primarily in the context of a hybrid fiber coax (HFC) cable architecture having a multiple systems operator (MSO), digital networking capability, IP delivery capability, and a plurality of client devices/CPE, the general principles and advantages of the disclosure may be extended to other types of distributed networks and architectures that are configured to deliver digital e.g., media data (e.g., text, video, and/or audio) or other data. Such other networks or architectures include optical, wired, and/or wireless elements, the following therefore being merely exemplary in nature. For instance, aspects of the present disclosure may be applied to communications or provisioning of DU entities associated with a CU within a 3GPP 5G NR (New Radio") system.

It will also be appreciated that while described generally in the context of a network providing data or content delivery services to users or subscribers of the HFC network referenced above, the present disclosure may be readily adapted to other types of environments including, e.g., commercial/enterprise, and government/military applications, and/or other types of internetworks. Myriad other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering, et al., *Internet Protocol, Version 6 (IPv6) Specification*, IETF RFC 2460 (December 1998) each of which is incorporated herein by reference in its entirety) and the associated Transport Control Protocol (TCP), it will be appreciated that the present disclosure may utilize other types of protocols (and in fact bearer networks to include other internets and intranets) to implement the described functionality.

Moreover, while the exemplary aspects of the disclosure are described primarily with respect to the "Remote PHY" variant of the Distributed-CCAP (D-CCAP) architecture of the relevant standards and specifications, it will be appreciated that these aspects may be readily adapted by those of ordinary skill, given the present disclosure, to other ones of the D-CCAP architecture(s) (including for instance the "Remote MAC+PHY" variant).

Lastly, it is noted that while a certain scheme or model (e.g., OSI model, Layers 1, 2, 3, etc.) for network layering or construction are referenced herein, the various aspects of the disclosure are in no way limited to such descriptions, models or schemes.

Other features and advantages of the present disclosure will immediately be recognized by persons of ordinary skill in the art with reference to the attached drawings and detailed description of exemplary embodiments as given below.

Management and Configuration of the RPD

In the above-mentioned DDA model, the exemplary Remote PHY Device or RPD and CCAP Cores communicate using a variety of protocols carried over IP. It is noted in passing that while the current specification describes a "Remote PHY Device", it is also possible to include other DOCSIS functions in the remote device (e.g. the DOCSIS MAC protocol functions), and hence more generic "Remote or Distributed Communications Devices" or RDCDs may be used consistent with the various aspects of the present disclosure, the RPDs being one exemplary species thereof.

As previously noted, communication between an exemplary CCAP Core entity and the RDCDs (e.g., RPDs), including during the RPD Initialization process, is set forth in Cable Labs specification "*Data-Over-Cable Service Interface Specifications DCA—MHAv2 Remote PHY Specification CM-SP-R-PHY-I06-170111*," incorporated herein by reference in its entirety (hereinafter "CM-SP-R-PHY-I06-170111"). The initialization process comprises, inter alia, the steps that the RPD executes after powering up to becoming fully operational. These steps including functions such as authenticating to the network (i.e., that the RPD is in fact a valid RPD), obtaining an IP address (e.g., IPv4 or IPv6), obtaining the IP addresses of the CCAP Core entity or entities with which it communicates, and establishing the necessary connections or sessions to the CCAP Core(s).

Figure 3:
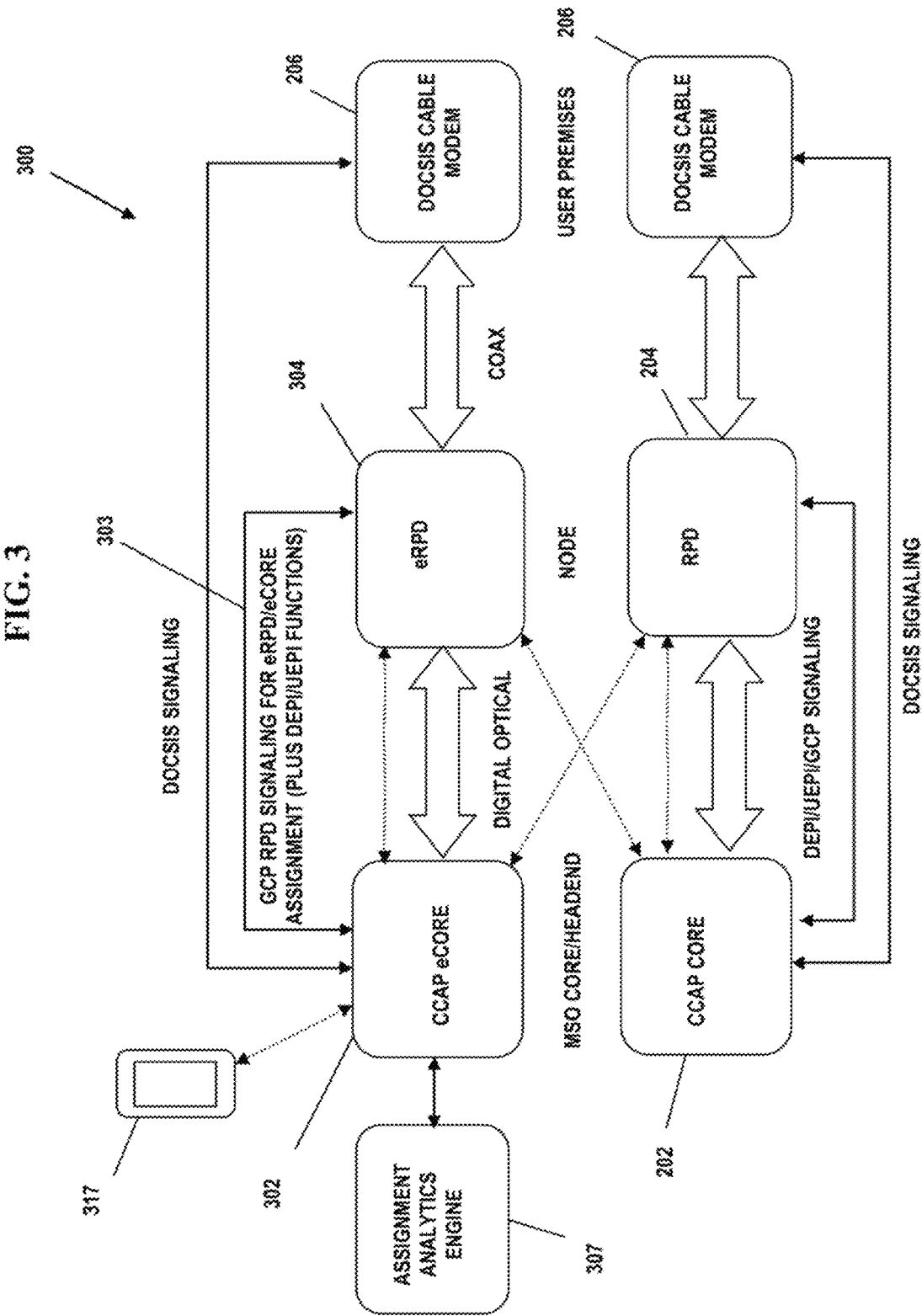
FIG. 3 is a block diagram illustrating an exemplary embodiment of a CCAP-based architecture implementing various aspects of the present disclosure.

Referring now to FIG. 3, one embodiment of a CCAP-based architecture according to the present disclosure is shown and described. Specifically, the architecture 300 of FIG. 3 provides, inter alia, facility for RPD and enhanced RPD (eRPD) data discovery by the enhanced CCAP Core (eCore) 302, and configuration of eRPDs 304 including assignment/re-assignment to one or more CCAP eCores 302 (and/or non-enhanced CCAP Cores 202). In the present context, the terms "eCore" and "eRPD" refer generally and without limitation to CCAP Core and RPD entities or processes, respectively, which have been enhanced with the various functions and capabilities for configuration, redirection, and assignment/re-assignment according to the present disclosure. For example, in one exemplary variant, the eCore implements a subset of the functionality of a Principal Core (e.g., only what is necessary to configure an redirect an RPD/eRPD), as well as the additional logic represented by inter alia, FIG. 7 herein that support interactions with the installer, handling RPD reboot cases, etc. It will be appreciated that these enhanced entities or components can be combined into a network architecture with non-enhanced components (i.e., in a heterogeneous configuration), depending on the particular desired attributes and state of deployment of the host distributed network.

Several operational considerations and/or use cases for assigning eRPDs or RPDs with a given eCore/Core entity (or set of eCore/Core entities) will be recognized. For example, an MSO or operator may want to assign an RPD/eRPD to a CCAP Core/eCore based on: (i) the make, model, serial number and/or software version of the RPD/eRPD; (ii) the location of the RPD/eRPD; (iii) the unique MAC address of the RPD/eRPD; (iv) an operator-assigned identifier (e.g., an alias or opaque variable), such as to create logical groupings of RPDs/eRPDs; and/or (v) a combination of information about the RPDs/eRPDs, the state of the CCAP Cores/eCores (e.g., the number of currently assigned RPDs/eRPDs per Core/eCore), other systems and external data (e.g. time of day), etc.

The present embodiment comprises, inter alia, a set of systems, apparatus, and methodologies to configure an RPD/eRPD (or more broadly an RDCD/eRDCD), and redirect it to one or more CCAP Core/eCore entities, based on a prescribed set of rules and/or data.

Referring again to FIG. 3, the exemplary eRPD and a given CCAP eCore communicate via three (3) different interfaces carried via the IP network layer protocol: (i) R-DEPI, (ii) R-UEPI, and (iii) GCP as previously described herein. Particularly, the GCP is utilized by exemplary embodiment of FIG. 3 to both (i) read information about the particular RPD/eRPD 304, and (ii) write configuration information and other data into the RPD/eRPD. These functions are necessary to performance of the assignment on an RPD/eRPD to one or more CCAP Cores/eCores 302 by the Analytics Assignment Engine (AAE) 307 as described in greater detail below.

Also shown in FIG. 3 is an optional assignment analytics engine 307, which in the exemplary configuration comprises one or more algorithmic programs or routines in data communication with the eCore 302 (including being disposed thereon, or distributed among multiple logical processing entities of the host cable or other network) configured to obtain the aforementioned data (i)-(v) and optimize assignment of the RPDs/eRPDs to eCores within the network, whether as a whole or based on analysis of only portions of the network (e.g., logical or geographic portions of the network topology).

In the illustrated embodiment, the architecture 300 of FIG. 3 is also configured to communicate with one or more mobile devices 317 (and processes running thereon), such as via an interposed wireless WLAN, cellular, or WMAN infrastructure, as described in greater detail subsequently herein. As such, the mobile device processes may also comprise part of the aforementioned analytics and assignment engine 307, such as by obtaining (and even pre-processing or calculating) various parameters relating to the RPD/eRPD installation/configuration process, and providing such parameter data back to the eCore 302 and/or engine 307.

It will be appreciated that various core "types" as specified by CM-SP-R-PHY-I06-170111 may be used consistent with the various aspects of the present disclosure. Core types are defined by CM-SP-R-PHY-I06-170111 to be either Principal or Auxiliary. An RPD/eRPD can be connected to multiple CCAP Cores/eCores. Each CCAP Core/eCore manages and configures an independent subset of the RPD resources; e.g., one or more RF channels. A Principal Core is responsible for the configuration of common parameters for the RPD (e.g., downstream power level), and for certain device management functions. Auxiliary Cores are responsible for providing other functions or services; e.g., DOCSIS, video, or OOB services, and are restricted to a resource set assigned to them by the cognizant Principal Core. An RPD must complete its configuration with the cognizant Principal Core before allowing configuration or re-configuration from an Auxiliary Core. Likewise, a given RPD must perform configuration from only one Principal Core.

Furthermore, a Principal Core can redirect an RPD (see Section 6.6.2.6 of CM-SP-R-PHY-I06-170111), including under instances where: (i) a Principal Core does not have configuration data for an RPD, or (ii) the Core is not aware of the RPD. In such cases, the Core can either reject the connection and log an error, or use the aforementioned GCP interface to redirect the unknown/unconfigurable RPD to another Core.

Accordingly, in the exemplary embodiment of the architecture 300 of FIG. 3, the concept of redirection is utilized to designate the eCore 302 as a "default" or fallback Principal Core, which can use data and rules embodied in the AAE algorithms/engine 307 to determine which "operational" Principal Core/s an RPD should be assigned to. The "default" eCore in one variant only implements the subset of Principal Core functions which are necessary to determine correct operational Core(s), and to redirect the RPDeRPD to it/them.

Figure 4:
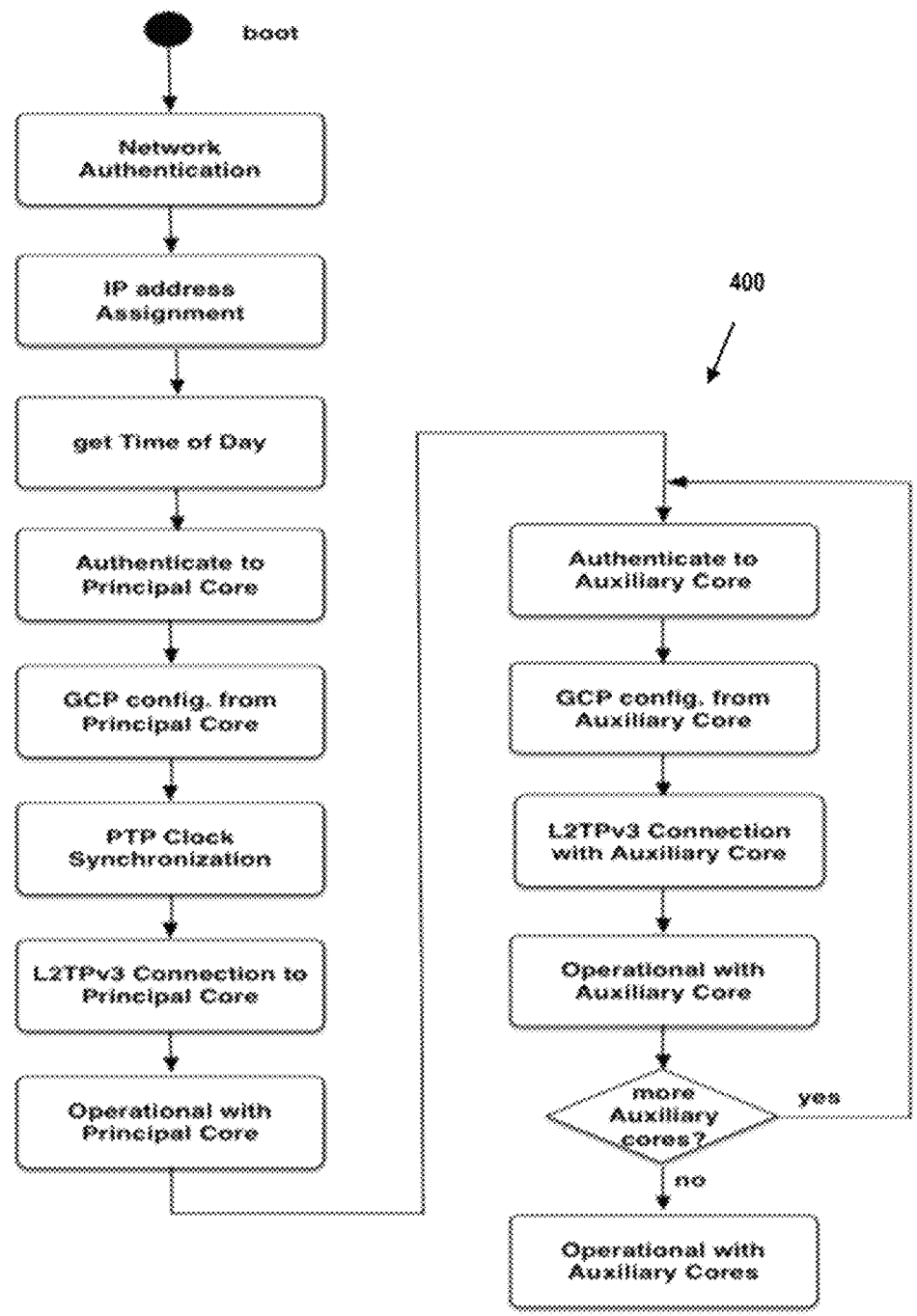
FIG. 4 is a logical flow diagram illustrating a prior art initialization process as described in CM-SP-R-PHY-I06-170111.
Figure 5:
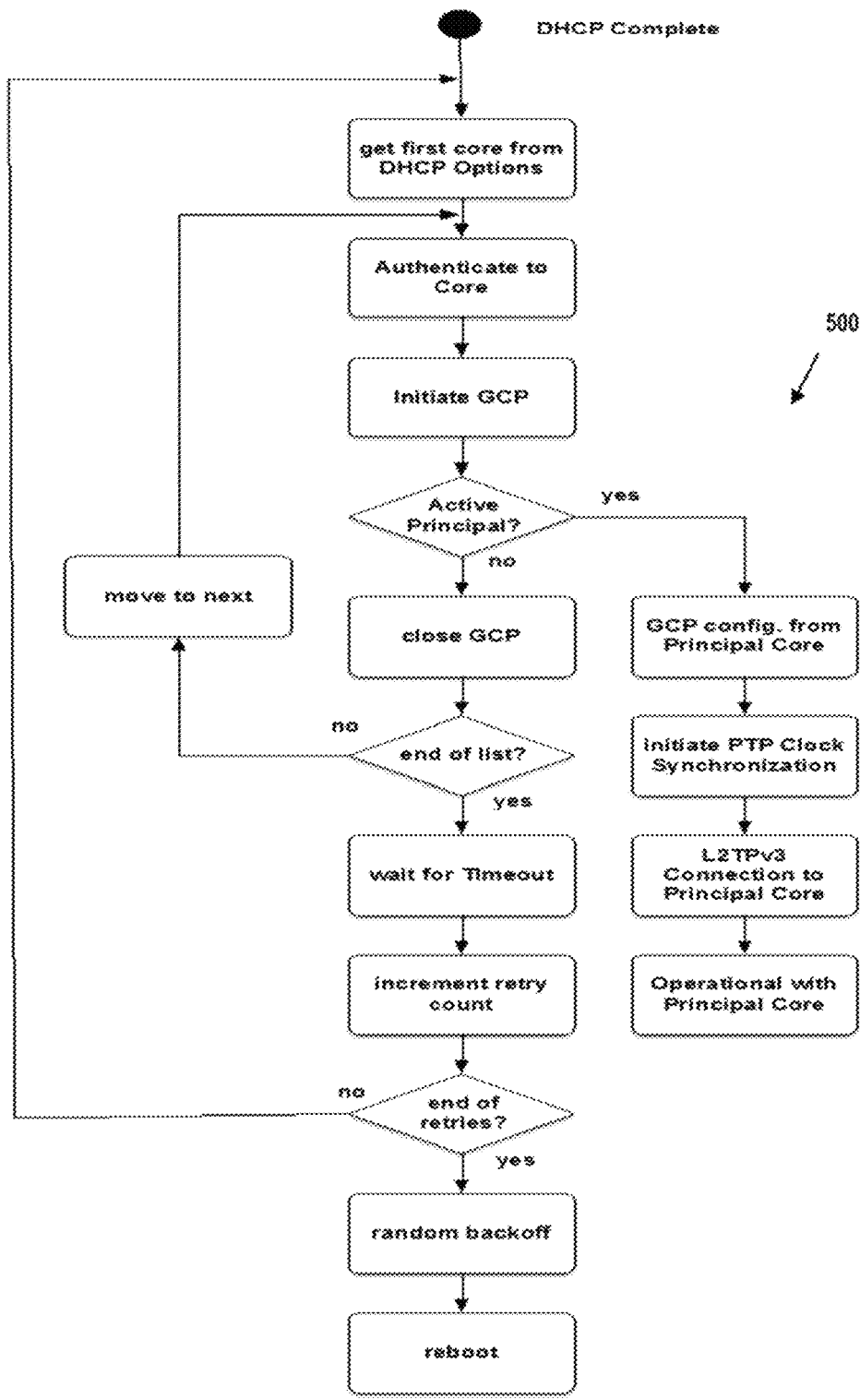
FIG. 5 is a logical flow diagram illustrating a prior art process for connection to a Principal CCAP Core as described in CM-SP-R-PHY-I06-170111.
Figure 6:
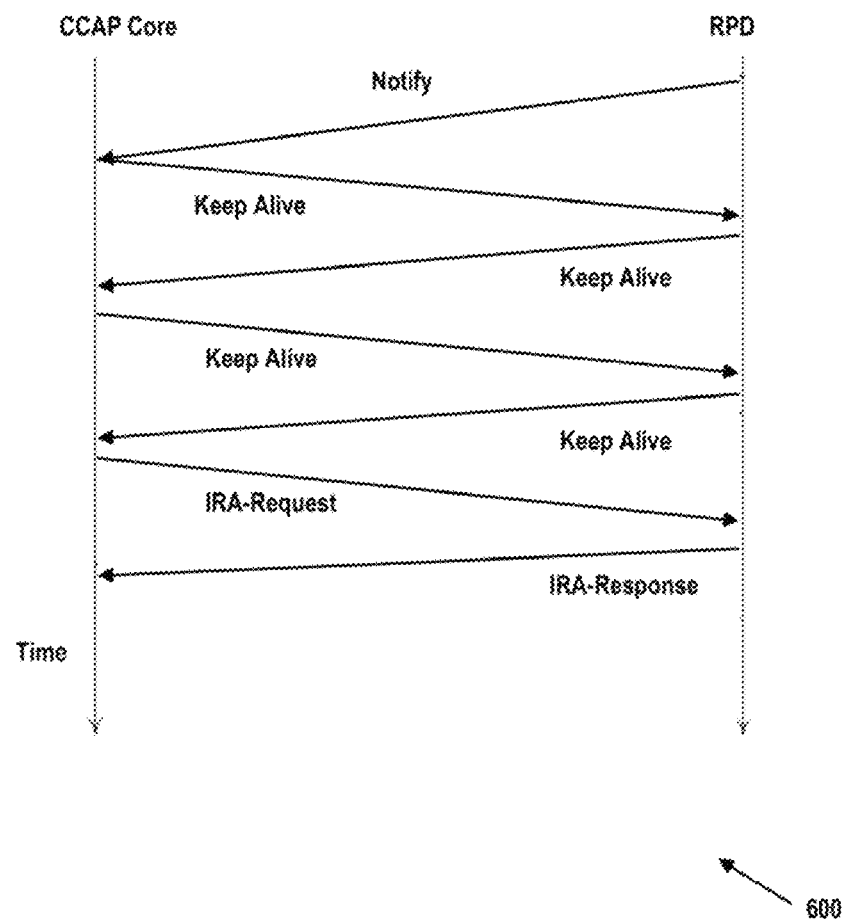
FIG. 6 is a ladder diagram illustrating a prior art keep-alive process as described in CM-SP-R-PHY-I06-170111.

Generally, in order to set up the communication session between a CCAP Core and an RPD, the RPD must go through an initialization process as described in CM-SP-R-PHY-I06-170111. The steps are shown in the logical flow chart 400 of FIG. 4 herein. The specific steps for connection to a Principal Core are also described in CM-SP-R-PHY-I06-170111, shown in the process 500 of FIG. 5 herein.

Once an RPD connects to a CCAP Core, it creates a connection via the GCP interface. After establishing a TCP connection, the RPD sends an NTF (notification) message to the CCAP Core, in order to allow the CCAP Core to identify the RPD. A number of TLVs are included in initial notification message sent by the RPD. Specifically, see Table 1 below:

TABLE 1

| TLV Name | Value |
| --- | --- |
| VendorName, | 50.19.1 |
| VendorId, | 50.19.2 |
| ModelNumber, | 50.19.3 |
| DeviceMacAddress, | 50.19.4 |
| CurrentSwVersion, | 50.19.5 |
| BootRomVersion, | 50.19.6 |
| DeviceDescription, | 50.19.7 |
| DeviceAlias, | 50.19.8 |
| SerialNumber, | 50.19.9 |
| RpdRcpProtocolVersion, | 50.19.14 |
| RpdRcpSchemaVersion, | 50.19.15 |
| DeviceLocation, | 50.24 |

Per CM-SP-R-PHY-I06-170111, based on the received information in the initial NTF message, a given CCAP Core can redirect the RPD to another CCAP Core (or a set of CCAP Cores) by sending to the RPD an IRA message with the RpdRedirect TLV (the latter which includes an ordered list of IP addresses of CCAP Cores). When the RPD receives such redirect request, it sends a response to the IRA message, and disestablishes the TCP connection to the redirecting CCAP Core. It then attempts to connect to the CCAP Core to which it is redirected.

CM-SP-R-PHY-I06-170111 further specifies that the CCAP core can delay the redirection for up to 60 secs., which is related to the timeout values specified for cases where a failure occurs (Section 6.6.2.5) or otherwise.

The Default CCAP Core must establish itself as the RPD's Principle Core so that it may use GCP to write certain configuration information into the RPD (e.g. DeviceAlias) before redirecting to an Operational Core. Hence, this requirement allows an RPD/eRPD installer in the present disclosure to configure these values at the time of installation. As a brief aside, the terms "installation" and "installer" as used herein are intended to refer to either or both of (i) an at least partly manual installation process, such as one conducted by one or more humans using e.g., application software executing on a mobile device operating system, and/or (ii) an automated or semi-automated computer program or process configured to execute to implement the installation process. For example, the installer may be a human using a software equipped mobile device, the software communicative with a back-end or network-based process (e.g., running on an MSO server) for communication of data relating to RPD/eRPD configuration. Alternatively, the installer may comprise only the automated or semi-automated back-end process operative to communicate data with the target RPD/eRPD via e.g., an application program or firmware installed on the RPD/eRPD and a wireline or wireless interface of the RPD/eRPD. For example, the RPD/eRPD may be part of a LAN, WLAN, WMAN, etc. such that the network installation process can contact it via such interposed networks and data interfaces, such as via TCP/IP protocols Ethernet protocols, or otherwise. As yet another alternative, the installer may comprise a process (e.g., software or other) wholly resident on the PRD/eRPD and configured to execute under a prescribed set of circumstances; e.g., only on initial startup, reboot, upon receipt of an external command, or other.

Per CM-SP-R-PHY-I06-170111, the steps for a CCAP Core to establish itself as a "Principle Core" are specified in Section 11.2 RPD "Startup with Multiple Cores," and generally include: (i) GCP TCP session establishment; (ii) the Principal CCAP Core writing its IP address into the Active-PrincipalCore object of the target RPD before attempting any other GCP write operations. Information configured into the RPD by the Default CCAP Core/eCore will persist after reboot/restart of the RPD/eRPD, and may include a number of TLVs or other parameters. Specifically, the Device Alias is a TLV that indicates a device name assigned by the network operator via management interface. This object is an 'alias' name for the RPD/eRPD device, and provides a non-volatile nomenclature for the RPD/eRPD.

The AssetId comprises a data string identifying the revision of the RPD/eRPD hardware, and is modeled after entPhysicalAssetID object defined in RFC 6933.

The Device Location Description object allows the RPD/eRPD to inform the CCAP Core about it its location. The format of the information is specific to an MSO or other operator.

The GeoLocationLatitude and DeviceGeoLocationLongitude objects allow the RPD/eRPD to inform the CCAP Core/eCore about the latitude and longitude portions of its geographic location, respectively.

After the Default CCAP Core completes configuration of the RPD/eRPD with the necessary information to derive the correct Operational Core/eCore, it can use the GCP protocol to reboot/reset the RPDeRPD, and then redirect the RPD/eRPD to the correct operational core during the subsequent GCP initialization attempt to the Default CCAP Core/eCore. Alternatively, the Default Core/eCore can use GCP to redirect the RPD/eRPD without the additional reboot/restart if the RPD/eRPD accepts the redirection configuration from the Default Core/eCore.

First Exemplary Implementation

Referring now to FIGS. 7-10, a first exemplary implementation of the various aspects of the disclosure set forth above is described in detail. In this implementation, operators of the DHCP system used by the RPDs/eRPDs are configured with the IP address of the Default CCAP Core/eCore as the Principal Core (i.e., in DHCP Suboption 61).

As previously discussed, when an RPD/eRPD is powered on, it boots and starts an initialization process including network authentication and address assignment via DHCP. In this implementation, the RPD/eRPD uses the Principal Core addresses in Suboption 61 of the DHCP response to establish communications with the Default CCAP Core/eCore. The Default CCAP Core/eCore will process the RPD/eRPD communication attempt as shown in the flow chart of FIG. 7. It will be appreciated that as used in FIG. 7 and other FIGS. Thereafter, the terms "RPD" and "Core" are meant to include either or both of enhanced RPDs (eRPDs) and non-enhanced RPDs, and enhanced Cores (eCores) and non-enhanced Cores, respectively, as applicable.

Referring again to FIG. 7, steps 702-706 of the process 700 complete the mutual authentication, establish the GCP interface, and process the RPD/eRPD Notify message. When ready for redirect (step 708), the Operational Core is determined (step 710) and the RPD/eRPD redirected thereto, and notification provided to the installer (steps 714-716). If no Operational Core is/can be determined, the connection is refused and an error logged per step 712.

Alternatively, in the case where the RPD/eRPD is not ready for redirect, the Default Core/eCore sets itself as the "Active Principal Core" in the RPD/eRPD, and notifies the installer that RPD is available to be configured per steps 718-720. Once configuration data is obtained from the installer per step 722, the RPD/eRPD software may be updated per step 724 and step 734, or alternatively the RPD/eRPD is then configured, the Operational Core determined, and the RPD/eRPD marked as ready for redirect per steps 726-730. Under either prong (software update/no software update), the RPD/eRPD is then rebooted (see e.g., step 732).

Figure 8:
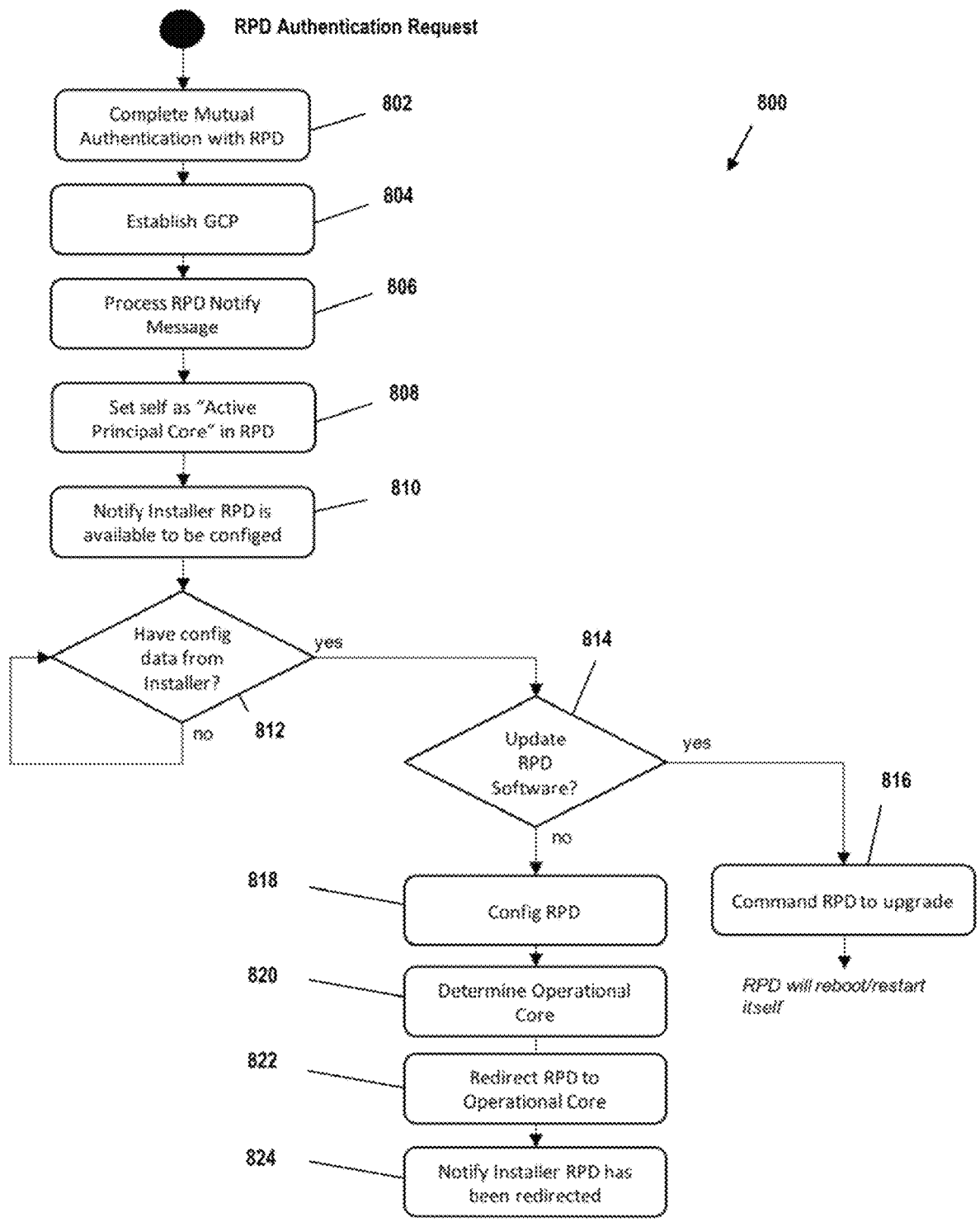
FIG. 8 is a logical flow diagram illustrating a second exemplary embodiment of a CCAP network communication processing method according to the present disclosure, wherein the relevant RDP/eRDP supports a redirection post-configuration via the GCP interface.

Alternatively, if the RDP/eRDP supports a redirection post-configuration via the GCP interface, the process is as shown in FIG. 8. Specifically, steps 802-806 of the process 700 complete the mutual authentication, establish the GCP interface, and process the RPD/eRPD Notify message. The Default Core/eCore sets itself as the "Active Principal Core" in the RPD/eRPD per step 808, and notifies the installer that RPD is available to be configured per step 810. Once configuration data is obtained from the installer per step 812, the RPD/eRPD software may be updated per step 814 and step 816, or alternatively the RPD/eRPD is then configured, the Operational Core determined, and the RPD/eRPD marked as ready for redirect per steps 818-822. Under either prong (software update/no software update), the RPD/eRPD is then rebooted (see e.g., step 824).

In either scenario, the RPD installer can make use of a portable or mobile computing device or distributed processes to receive notifications or check the state of the RPD/eRPD processing by the Default CCAP Core/eCore. Moreover, the installer can use such portable or mobile computing devices or distributed processes to provide the Default CCAP Core with certain configuration data (e.g. Device Alias, Device Location Description, GeoLocation-Latitude, DeviceGeoLocationLongitude, AssetId, etc.). Depending on configuration, the installer can manually enter this data using the portable/mobile device (i.e., via the UI of the device), generate some of the data using the device's capabilities (e.g. GPS receiver), and/or use the device to acquire some of the data from other systems (e.g. web service for generating AssetIds) via wireless interface of the mobile device. Alternatively, where the installer comprises a computerized process (e.g., one operative to run on a designated server or other platform which can access the RDP/eRPD being "installed," this process can obtain the relevant data for provision to the RPD/eRPD via one or more networked sources (e.g., from an MSO LAN, external webserver, etc.).

After the RPD installer has provided configuration data the Default CCAP Core/eCore can also command the RPD to initiate a secure software update based on data and rules. After the upgrade is completed, the RPD/eRPD will reboot and will be processed per the above processes flows.

In the exemplary implementation, determination (identification) of the Operational Core includes obtaining data from external systems (e.g., via data "push" or "pull"), or via manual entry by an MSO or other systems operator via an administration data interface. The obtained data is also processed, and related calculations based on a set of rules or programmatic logic (e.g. computer programs, scripts, etc.) are made. In one variant, eCore/eRPD assignments that implement a topology that is consistent with or embodies the overall network topology, or specific topological policies, is calculated. For example, under one approach, all the RPDs/eRPDs serving a specific five-block geographic area are assigned to a set of CCAP Cores/eCores located in a specific data center and running a specific version of the CCAP code. Similarly, all the RPDs/eRPDs serving subscribers connected to a specific distribution hub may be assigned to a set of CCAP Cores/eCores located in a specific data center and running a specific version of CCAP code.

In another variant, a network operator may want to set a policy that assigns RPDs/eRPDs serving a specific distribution hub across two data centers (i.e., an "active-active" topology). If one set of serving Cores/eCores failed for whatever reason, only half of the RPDs/eRPDs would have to be re-assigned. This approach in effect allows operators to enforce failure group size policies for RPDs/eRPDs and CCAP Cores/eCores by including such data as a parameter within the policy assignment calculation.

The Default CCAP Core/eCore can be configured with logical groupings of one or more Operational CCAP Cores/eCores, with such groupings reflected in e.g., data structures such as files. Furthermore, each grouping and/or individual core in the grouping and be configured with associated metadata. These logical groupings and associated metadata can be used for example in the calculation of the correct Operational Core to which to redirect the RPD. Specifically, as referenced above, the logical groupings of Cores/eCores are part of the overall network topology. For example, a network operator may want all the RPDs/eRPDs servicing a particular set/subset of subscribers connected via a prescribed hub (e.g., HUB-A) assigned to a particular set of Cores. Furthermore, for performance reasons, the RPDseRPDs may need to be distributed across multiple Core instances. Therefore, the operator may define a logical grouping—e.g., of N Cores—for that HUB-A. Each Core would have metadata (or other data) associated with it that allows the network policy engine (e.g., the analytics engine 307 of FIG. 3 herein) to calculate the assignment based on the desired topology. Each Core may also be configured with metadata or other ancillary data, such as for example a list of street addresses that it supports, or a logical name. When the installer sets up a given RPD/eRPD, they/it can configure the DeviceAlias thereof to include one of the assigned logical names. The policy engine 307 may then match that RPD/eRPD location or the DeviceAlias to the metadata to determine the assignment.

Figure 9:
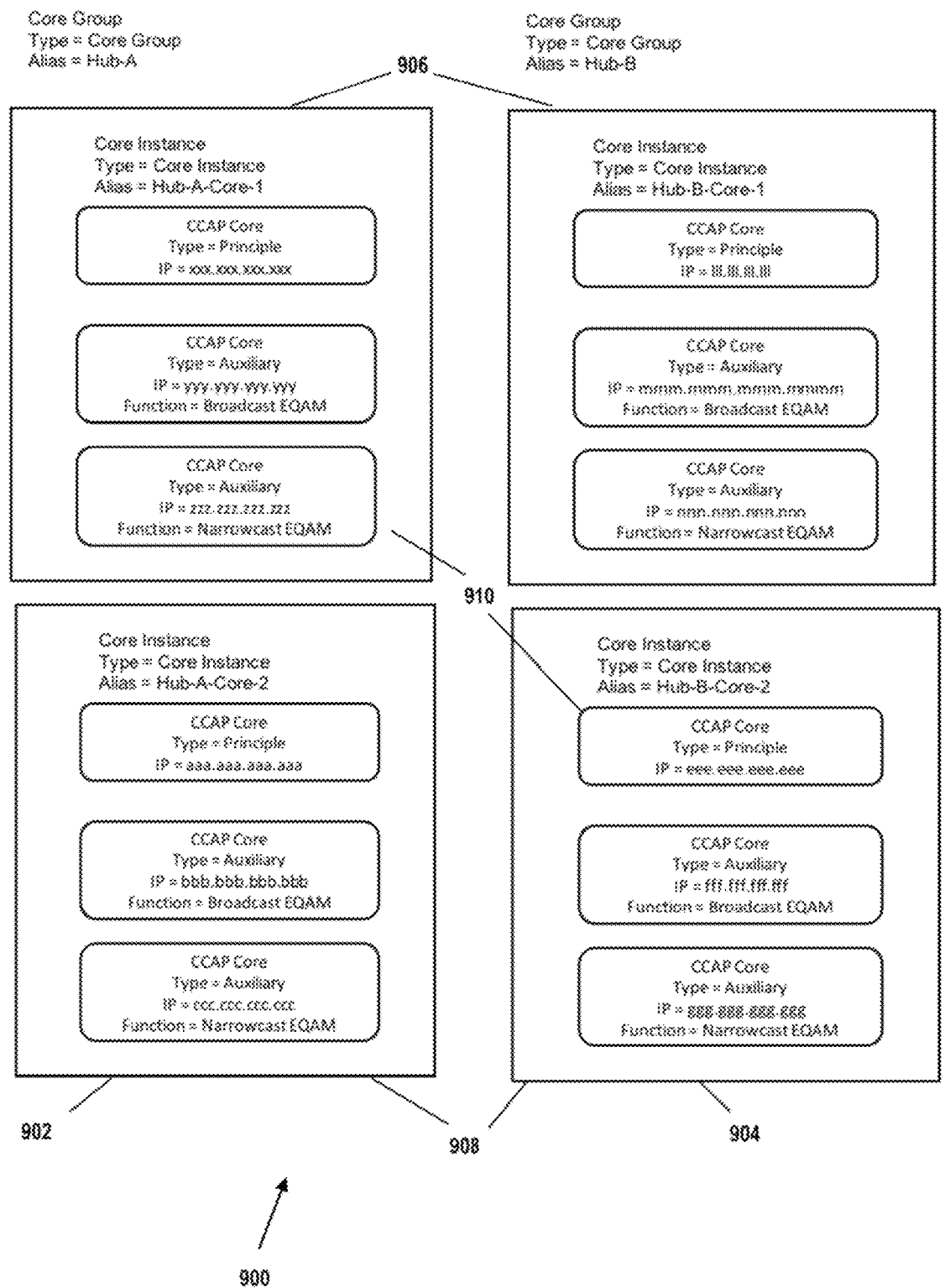
FIG. 9 is a graphical illustration of a logical grouping of Operational CCAP Cores/eCores and associated metadata according one embodiment of the disclosure.

The foregoing mechanisms can be used for a variety of functions, including for instance to enable operational features, describe or identify behaviors, support load balancing of RPDs/eRPDs across a grouping of Operational Cores/eCores, or for identification/response of predetermined failover behaviors. As but one example, FIG. 9 illustrates a logical grouping of Operational CCAP Cores/eCores and associated metadata according to the disclosure. As shown, the logical grouping configuration 900 includes two logical groups 902, 904 (grouped according to association with Hub A and Hub B, respectively), each with two or more core instances 906, 908 (e.g., Core 1 and Core 2 associated with Hub A and Hub B, respectively). Each core instance 906, 908 includes multiple individual cores 910, including e.g., a Principal Core and one or more Auxiliary Cores as shown. Metadata may include for example data indicative of the function of each Core (e.g., Broadcast QAM), and IP address. In one implementation, the IP address of a given Core/eCore is derived from the output of the above-described assignment calculation(s); a list of operational cores is returned to the RPD/eRPDs during the redirect process.

Figure 7:
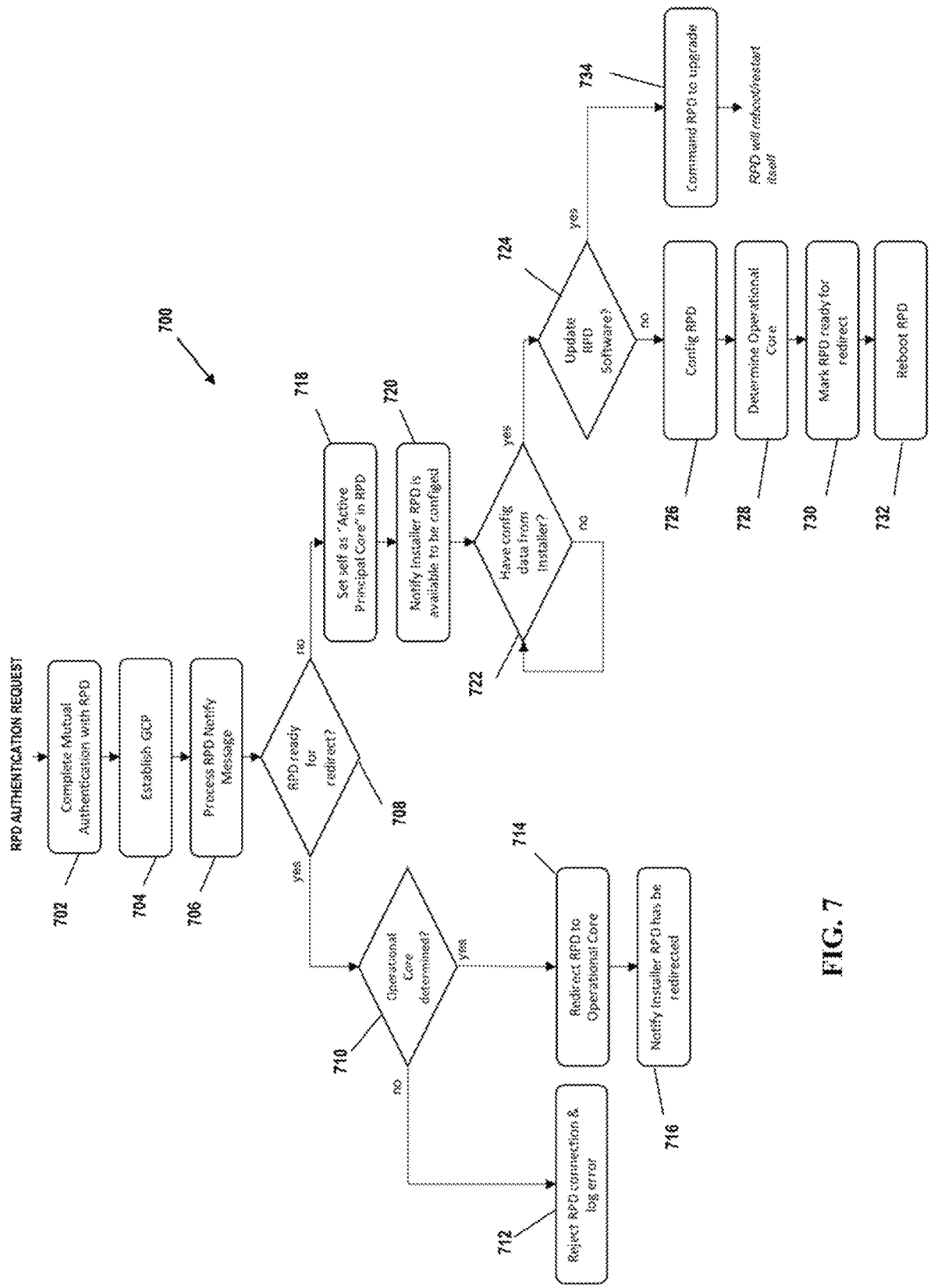
FIG. 7 is a logical flow diagram illustrating an exemplary embodiment of a CCAP network communication processing method according to the present disclosure.
Figure 10:
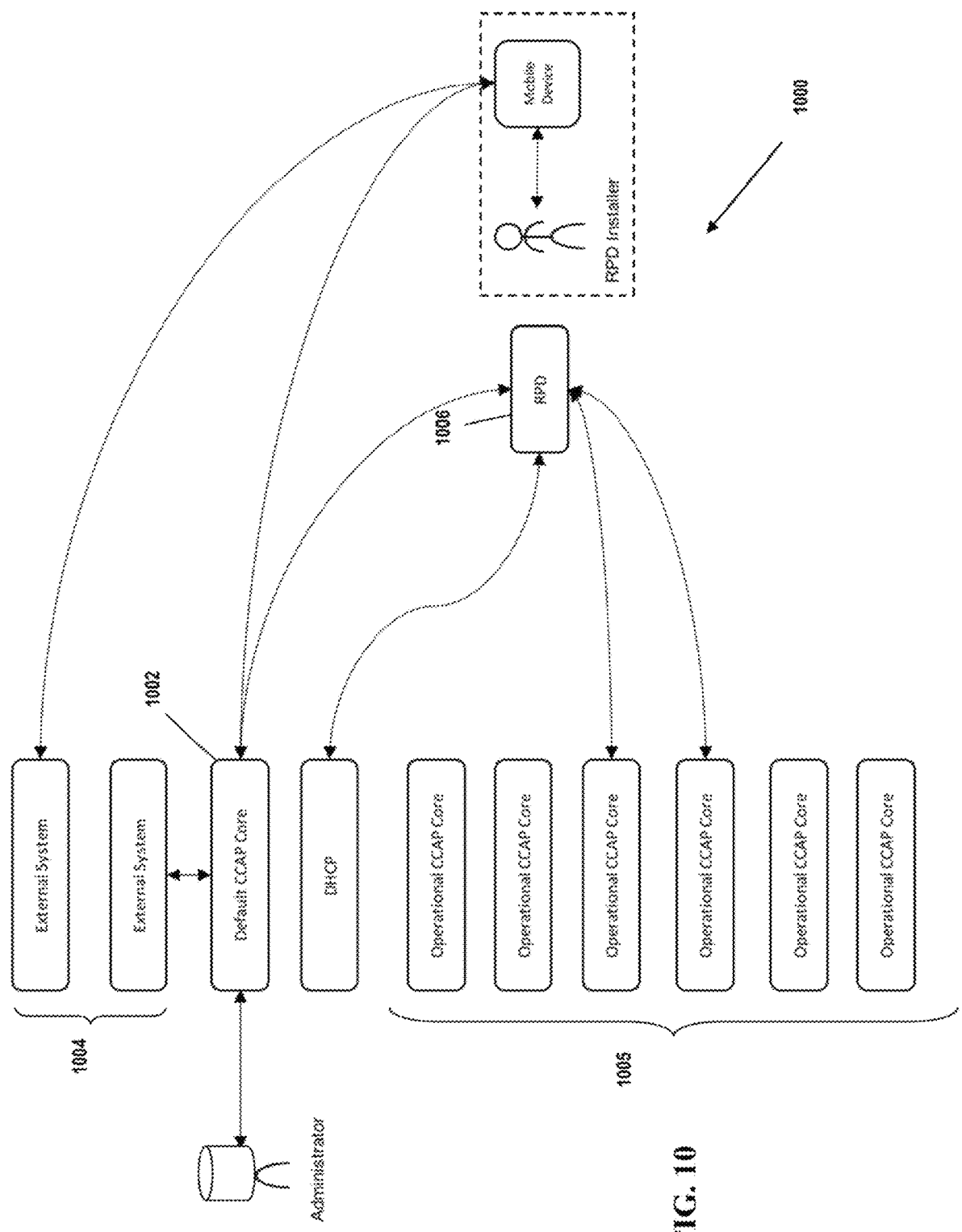
FIG. 10 is a logical block diagram illustrating an exemplary CCAP-based architecture consistent with the methods of FIGS. 7 and 8, and interrelationships of the components thereof, according to the present disclosure.

FIG. 10 herein illustrates an overall system view of the architecture 1000 of the exemplary implementation described with respect to FIGS. 7-9, including the Default CCAP Core/eCore 1002, external system(s) 1004, and Operational CCAP Core/ECore(s) 1005, and their relationship to the RPD/eRPD(s) 1006.

Second Exemplary Implementation

Figure 11:
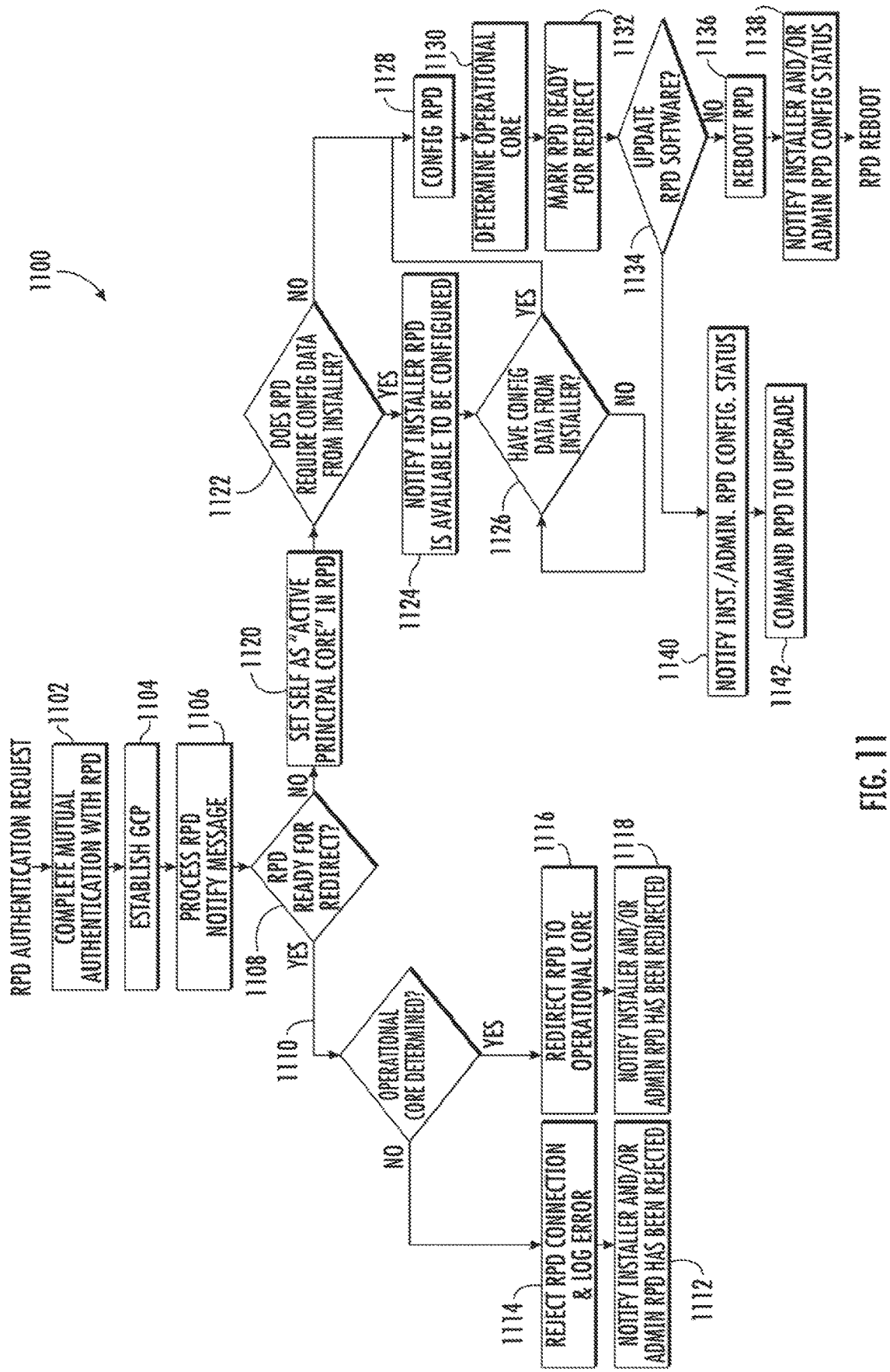
FIG. 11 is a logical flow diagram illustrating another exemplary embodiment of a CCAP network communication processing method according to the present disclosure.
Figure 12:
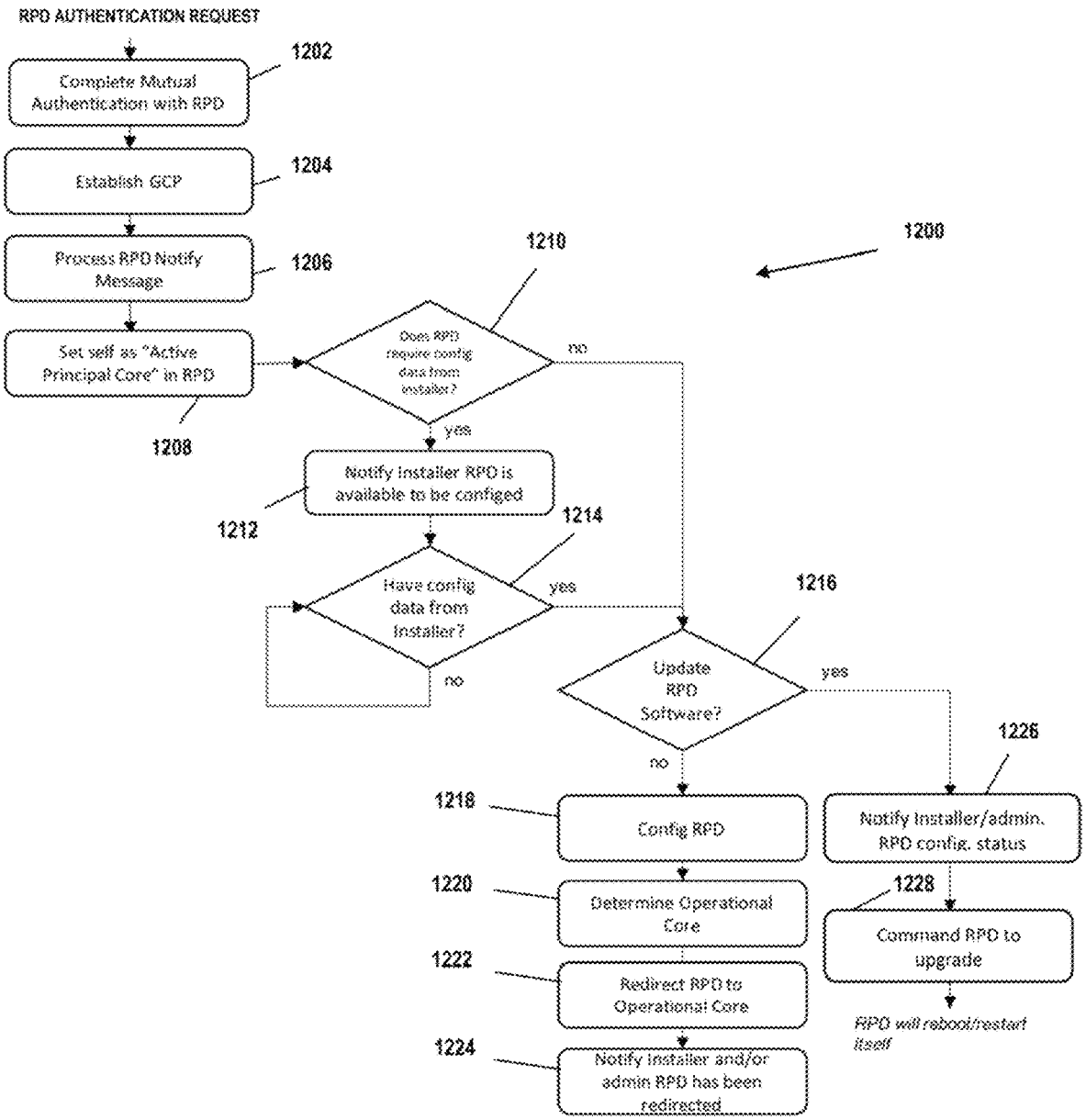
FIG. 12 is a logical flow diagram illustrating yet another exemplary embodiment of a CCAP network communication processing method according to the present disclosure, wherein the relevant RDP/eRDP supports a redirection post-configuration via the GCP interface.
Figure 13:
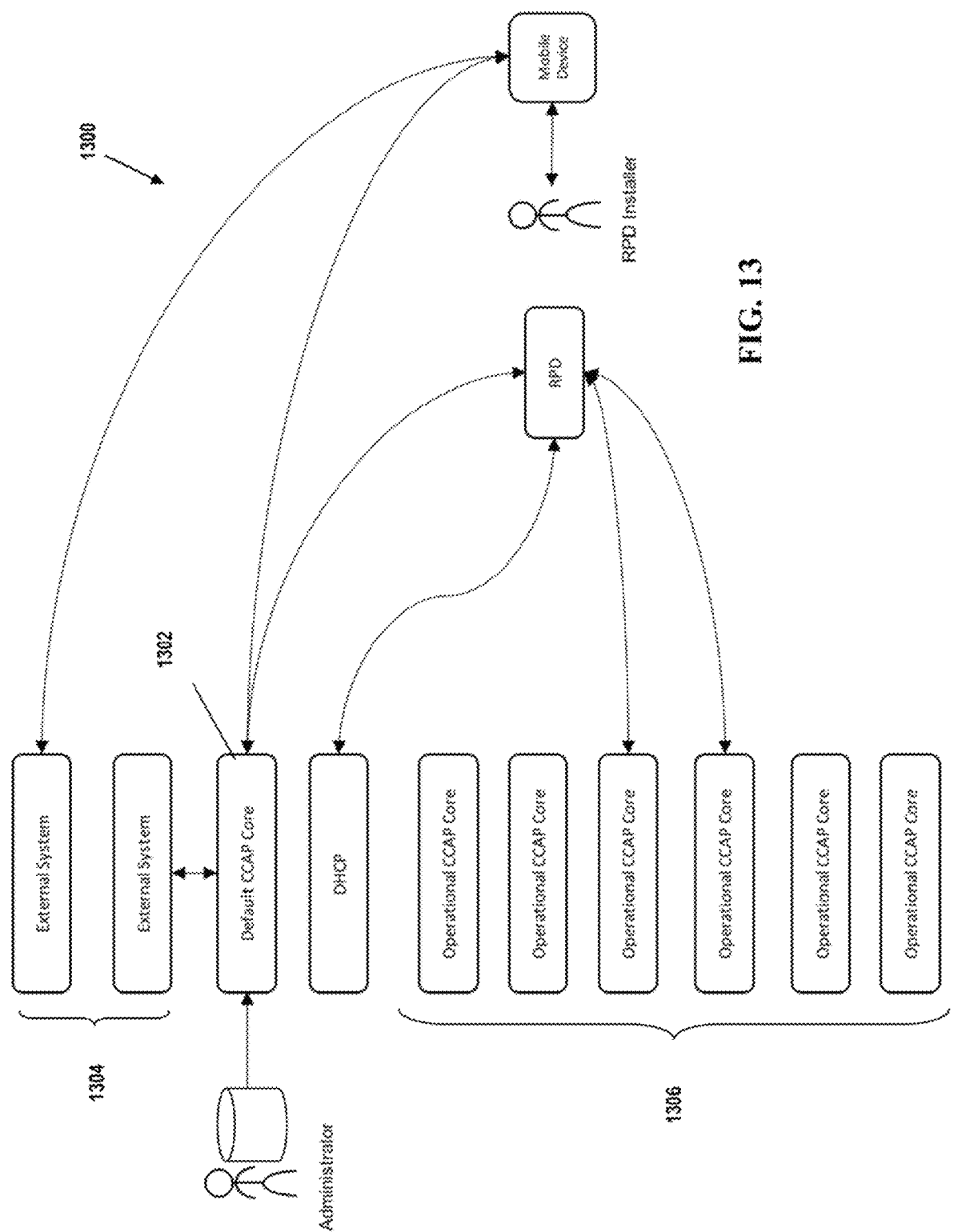
FIG. 13 is a logical block diagram illustrating an exemplary CCAP-based architecture consistent with the methods of FIGS. 11 and 12, and interrelationships of the components thereof, according to the present disclosure.

Referring now to FIGS. 11-13, a second exemplary implementation of the various aspects of the disclosure set forth above is described in detail. In this implementation, an operational process that supports RPDs/eRPDs that do not require additional configuration data from the installer is included. For example, the RPD/eRPD may have an embedded GPS receiver, and/or the Default CCAP Core/eCore uses data from external systems to determine or create any necessary configuration data (e.g. Device Alias, Device Location Description, GeoLocationLatitude, DeviceGeoLocationLongitude, AssetId, etc.). In the exemplary case of the RPD/eRPD having an embedded GPS capability, the Default CCAP Core can use data from external systems (and/or data manually entered by the operator via the aforementioned administrative data interface) to determine or create the relevant parameters or IDs for a given RPD/eRPD, such as the Device Alias, Device Location Description, etc., based on a set of rules or programmatic logic (e.g. computer programs, scripts). This implementation also includes the functionality of notifying the installer (and/or an administrator) of the status of configuration processing for the given RPD/eRPD.

As with the first implementation, operators of the DHCP system used by the RPDs/eRPDs are configured with the IP address of the Default CCAP Core/eCore as the Principal Core (i.e., in DHCP Suboption 61). The Default CCAP Core/eCore will process the RPD/eRPD communication attempt as shown in the flow chart of FIG. 11. Specifically, as shown, steps 1102-1106 of the process 1100 complete the mutual authentication, establish the GCP interface, and process the RPD/eRPD Notify message. When ready for redirect (step 1108), the Operational Core is determined (step 1110) and the RPD/eRPD redirected thereto, and notification provided to the installer (steps 1116-1118). If no Operational Core is/can be determined, the connection is refused and an error logged per step 1112, and the installer notified per step 1114.

Alternatively, in the case where the RPD/eRPD is not ready for redirect, the Core/eCore sets itself as the "Active Principal Core" in the RPD/eRPD per step 1120. If the RPD requires configuration data from the installer per step 1122, the installer is notified that the RPD/eRPD is available to be configured per step 1124. Once configuration data is obtained from the installer per step 1126, the RPD/eRPD is then configured, the Operational Core determined, and the RPD/eRPD marked as ready for redirect per steps 1128-1132. If a software update is required per step 1134, the installer is notified per step 1140 and a command issued to cause the RPD/eRPD to upgrade per step 1142. If no software upgrade is required, the RPD/eRPD is rebooted and the installer (and/or admin. process) notified per steps 1136-1138.

Alternatively, if the RDP/eRDP supports a redirection post-configuration via the GCP interface, the process is as shown in FIG. 12. Specifically, steps 1202-1206 of the process 1200 complete the mutual authentication, establish the GCP interface, and process the RPD/eRPD Notify message. The Core/eCore sets itself as the "Active Principal Core" in the RPD/eRPD per step 1208, and then per step 1210, if the RPD/eRPD requires configuration data from the installer, notifies the installer that RPD/eRPD is available to be configured per step 1212. Once configuration data is obtained from the installer per step 1214, the RPD/eRPD software may be updated per steps 1216, 1226 and 1228, or alternatively the RPD/eRPD is then configured, the Operational Core determined, the RPD/eRPD redirected to the Operational Core, and the installer and/or admin. process notified of the redirection per steps 1218-1224.

FIG. 13 herein illustrates an overall system view of the architecture 1300 of the exemplary implementation described with respect to the methodologies of FIGS. 11-12.

FIG. 9 discussed above illustrates an exemplary logical grouping of Operational CCAP Cores/eCores and associated metadata useful with the implementation of FIGS. 11-13.

Third Exemplary Implementation

Figure 14:
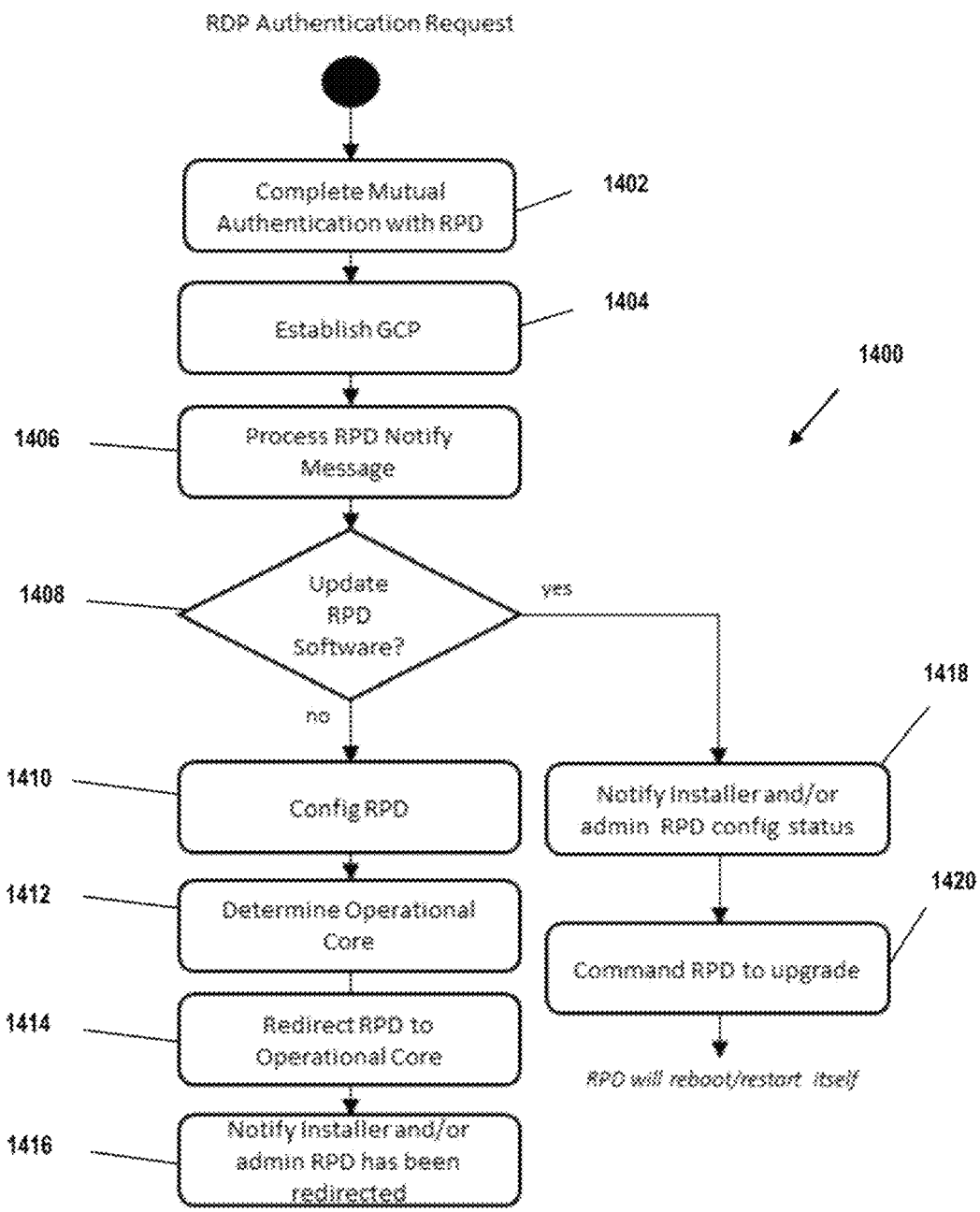
FIG. 14 is a logical flow diagram illustrating another exemplary embodiment of a CCAP network communication processing method for RPDs/eRPDs that do not require additional configuration data from the installer, according to the present disclosure.

Referring now to FIG. 14, a third exemplary implementation of the various aspects of the disclosure set forth above is described in detail. In this implementation, an operational process is included that supports RPDs/eRPDs that do not require additional configuration data from the installer (and which can be redirected in less than the 60-second timeout period described in the Cable Labs MHAv2 Remote PHY Specification CM-SP-R-PHY-I06-170111 previously incorporated herein. Specifically, CM-SP-R-PHY-I06-170111 states at Section 6.6.2.6 that if a Principal CCAP Core does not have configuration data for an RPD (or is not aware of the RPD), the core should either reject the connection and log an error, or use GCP to redirect the RPD to another core. Moreover, a CCAP Core can elect to redirect (via GCP) an RPD to one or more alternate CCAP Cores for further configuration, such as to act as a standby or to provide additional services. The redirecting CCAP Core transfers a variable length list of IPv4/IPv6 addresses to the RPD, but can delay providing the redirect information to the RPD for a period of up to 60 seconds.

Hence, in this third implementation, the Default CCAP Core/eCore would again not have to designate itself as the Primary CCAP Core. For example, the RPD/eRPD may have an embedded GPS receiver, and/or the Default CCAP Core/eCore uses data from external systems to determine or create any necessary configuration data (e.g. Device Alias, Device Location Description, GeoLocationLatitude, DeviceGeoLocationLongitude, AssetId, etc.). In the exemplary case of the RPD/eRPD having an embedded GPS capability, the Default CCAP Core can use data from external systems (and/or data manually entered by the operator via the aforementioned administrative data interface) to determine or create the relevant parameters or IDs for a given RPD/eRPD, such as the Device Alias, Device Location Description, etc., based on a set of rules or programmatic logic (e.g. computer programs, scripts). This implementation also includes the functionality of notifying the installer (and/or an administrator) of the status of configuration processing for the given RPD/eRPD.

As with the first implementation, operators of the DHCP system used by the RPDs/eRPDs are configured with the IP address of the Default CCAP Core/eCore as the Principal Core (i.e., in DHCP Suboption 61). The Default CCAP Core/eCore will process the RPD/eRPD communication attempt as shown in the flow chart of FIG. 14. Specifically, as shown, steps 1402-1406 of the process 1400 complete the mutual authentication, establish the GCP interface, and process the RPD/eRPD Notify message.

If a software update is required or to be conducted per step 1408, the installer is notified per step 1418 and a command issued to cause the RPD/eRPD to upgrade per step 1420. If no software upgrade is required or to be conducted, the RPD/eRPD is configured per step 1410, and the Operational Core/eCore determined per step 1412. The RPD/eRPD is then redirected to the Operational Core per step 1414, and the installer (and/or admin. process) notified per step 1416.

FIG. 9 illustrates an exemplary logical grouping of Operational CCAP Cores/eCores and associated metadata useful with the methodology of FIG. 12.

Fourth Exemplary Implementation

Figure 15A:
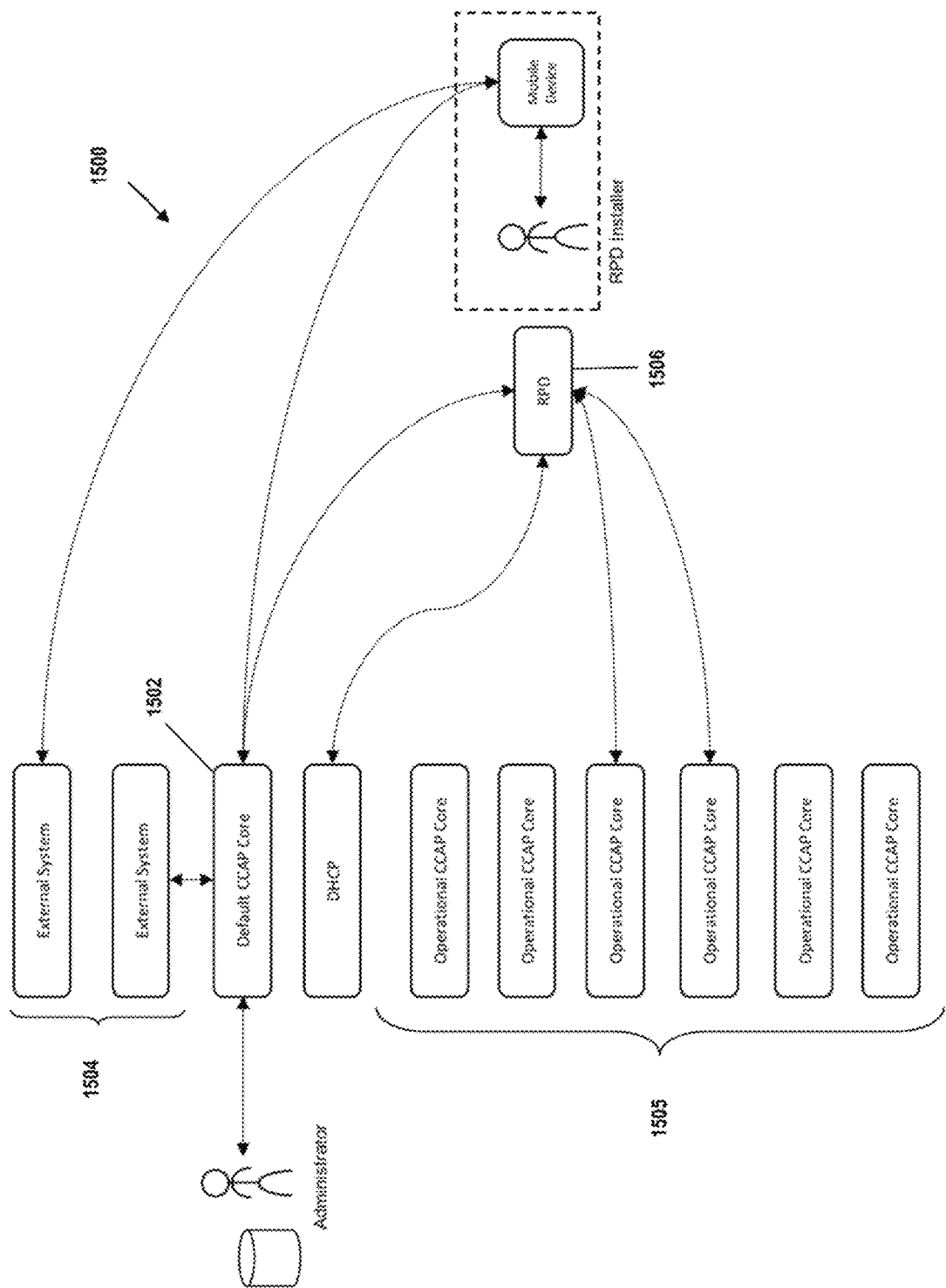
FIGS. 15A and 15B are logical block diagrams illustrating other exemplary CCAP-based architectures and interrelationships of the components thereof (including the ability of the external system(s) used by the Default CCAP to interact with the systems used to manage the Operational CCAP Cores/eCores), according to the present disclosure.
Figure 15B:
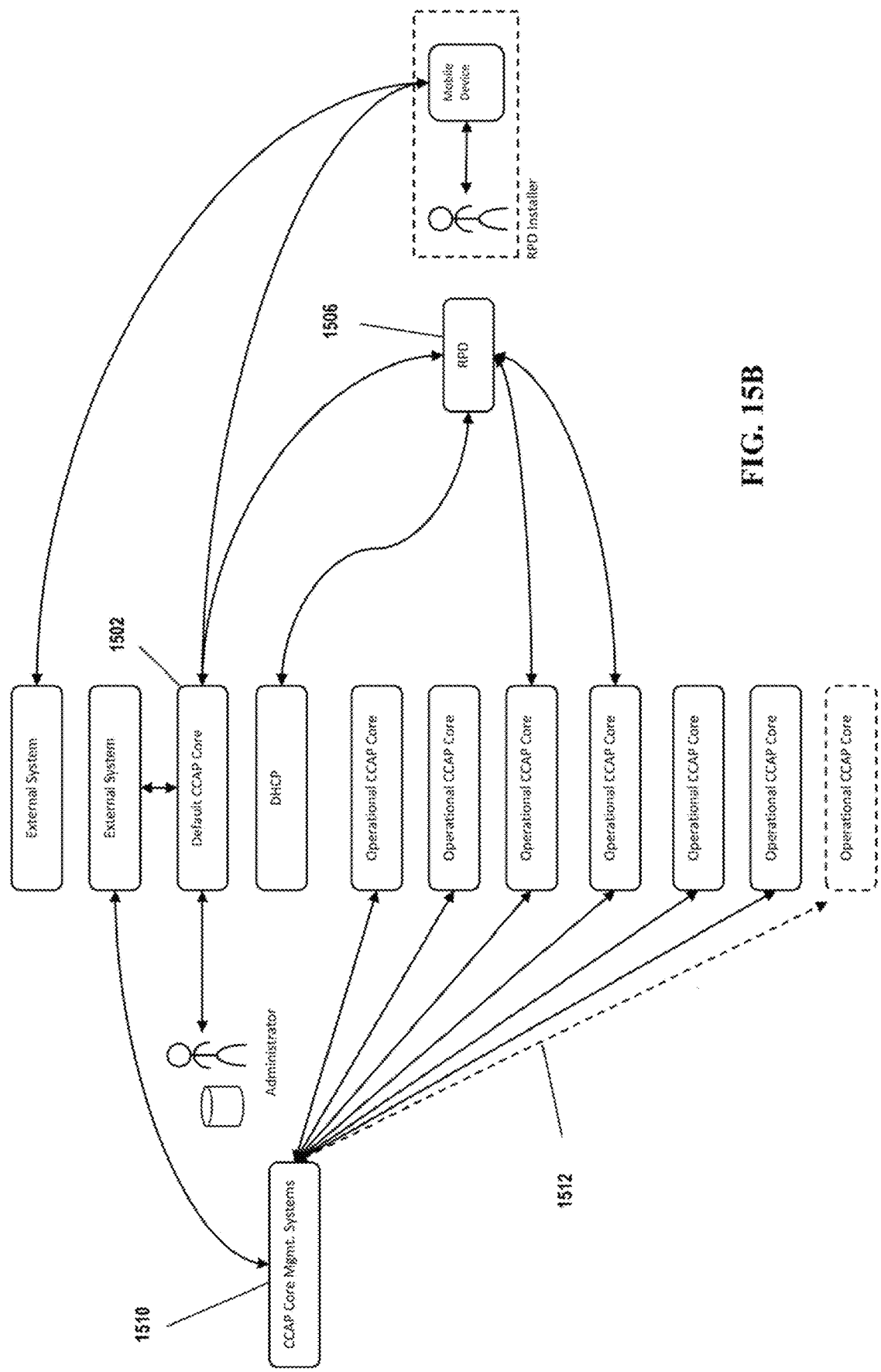

Referring now to FIGS. 15A and 15B, a fourth exemplary implementation of the various aspects of the disclosure set forth above is described in detail. This implementation is useful with, inter alia, all the previous implementations described above, and includes the ability of the external system(s) 1504 used by the Default CCAP to interact with the systems used to manage the Operational CCAP Cores/eCores 1505. This functionality allows the Default CCAP Core/eCore 1502 to identify the current state of the Operational CCAP Cores/eCores and the associated RPDs/eRPDs 1506, which can be used in the process to identify the Operational CCAP Core to which to assign a given RPD/eRPD. This process can include obtaining and using information about the operational state of a given Operational CCAP Core/eCore, the number of RPDs/eRPDs currently assigned to a given Operational CCAP Core/eCore, the version of hardware or software of a given Operational CCAP Core/eCore, and/or other information about the Operational CCAP Core/eCore 1505 that may be useful to the state analysis and assignment process.

In the exemplary embodiment, the interaction between the external system(s) used by the Default CCAP Core/eCore and the systems 1510 used to manage the Operational CCAP Cores is subscribe/notify based, although other approaches such as query/response may be used. The former advantageously allows the external system(s) used by the Default CCAP Core/eCore to receive unsolicited updates when a given Operational CCAP Core/eCore 1505 changes state or configuration.

Furthermore, in the case where Operational CCAP Cores/eCores are implemented as functions in a virtualized computing environment, the external system(s) used by the Default CCAP Core/eCore to interact with the systems used to manage the Operational CCAP Cores/eCores can invoke a software process that results in the Operational CCAP Core's management systems 1510 creating new instances of an Operational CCAP Core/eCore (such as for example in an object-oriented environment such as Java). This can advantageously allow for flexible scaling of Operational CCAP Cores/eCores based on, e.g., the rate of RDPs/eRPDs requesting assignment via the Default CCAP Core (as reflected by the dashed line 1512 in FIG. 15B).

It will further be appreciated that the Default CCAP Core/eCore 1502 can also be implemented as functions in a virtualized computing environment (similar to the Operational Core/ECore(s) 1505), and hence scale up or down instances as need to handle the rate of RDPs/eRPDs requesting assignment via the Default CCAP Core/eCore 1502.

FIG. 15B illustrates an overall system view of the architecture of the fourth exemplary implementation described above with respect to FIG. 15A.

Exemplary Analytic Engine Calculations

Figure 16:
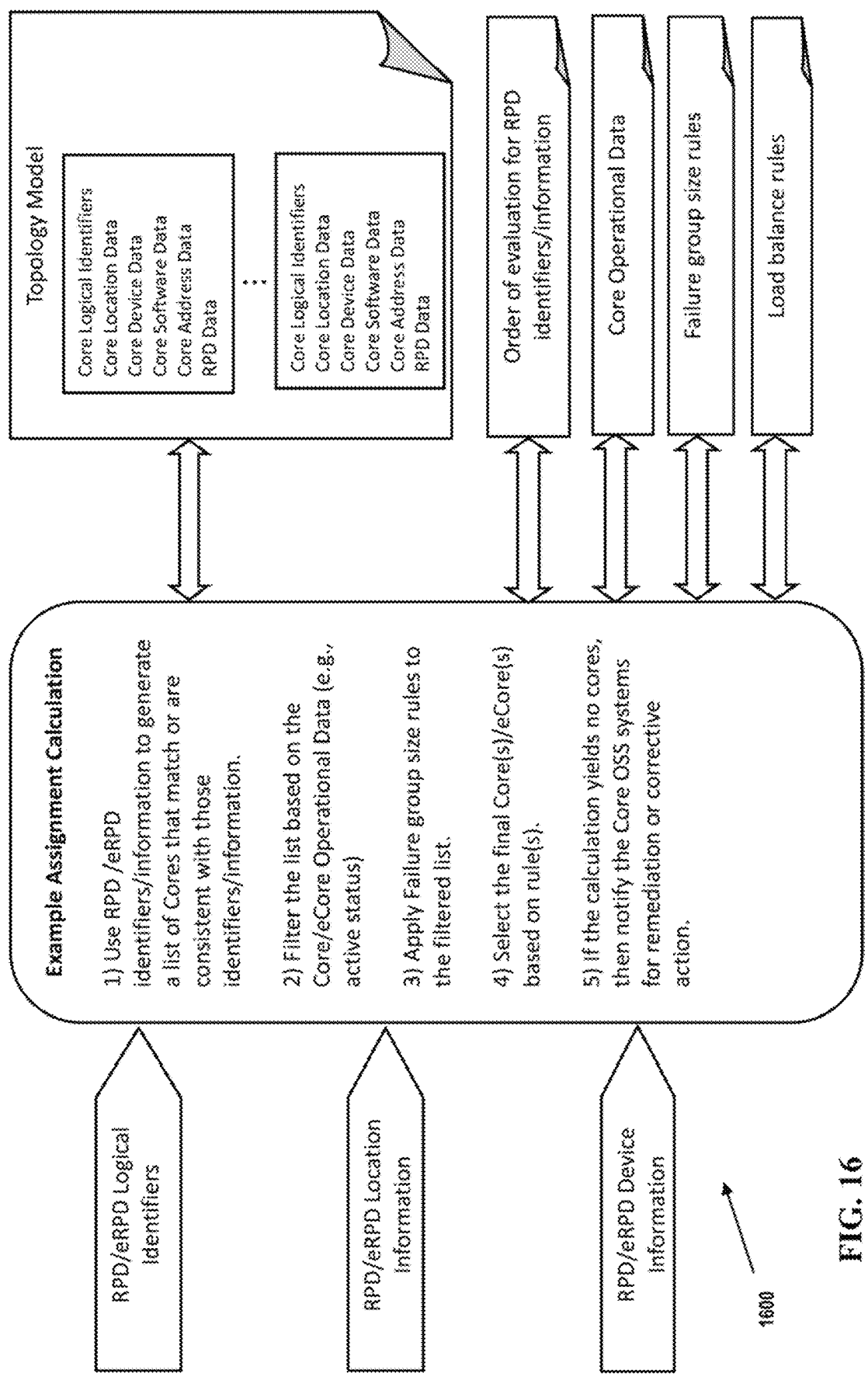
FIG. 16 is a graphical representation of an exemplary embodiment of an analytics engine calculation according to the present disclosure.

FIG. 16 is a graphical representation of an exemplary embodiment of an analytics engine calculation of the type previously referenced herein; i.e., for Core/eCore-to-RPD/eRPD allocation and/or topology determination.

In the illustrated embodiment, the process 1600 includes first obtaining RPD/eRPD logical identifiers, location information, and/or device-specific information as described previously from the pool of RPDs/eRPDs participating in the allocation/calculation. This may be as few as a single RPD/eRPD, or several.

Next, based on an order of evaluation, the RPD/eRPD identifiers/information previously obtained is used to generate a list of Cores/eCores that match, or are consistent with, those identifiers/information. For instance, in one variant, a search/match function is used to search relevant portions of Core/eCore data for an explicit match to one or more data items. Alternatively, more heuristic or non-deterministic approaches to selection may be used, such as fuzzy logic variables, scoring, minimum thresholds, etc.

Next, the generated list of Cores/eCores is filtered based on the Core/eCore Operational Data (e.g., status such as active/inactive/non-operational, etc.).

One or more failure group size rules (or other rules such as load balancing) are then applied to the filtered list, and the final list of Core(s)/eCore(s) selected. For example, if the list of active Cores/eCores includes entities that are located across multiple data centers, the Cores/eCores from a single datacenter are selected such that the RPDs/eRPDs are evenly distributed across the data center(s), such as to achieve desired failure mitigation or containment, load balancing across different data centers, etc.

If the aforementioned calculation by the analytics engine 307 yields no viable Cores/eCores, then the Core OSS systems are notified (such as via a protocol message) of the failure. In one variant, this notification instigates the OSS (or its proxy entity or entities) to remediate, such as bringing one or more new Cores/eCores on line. In one implementation, the notification message from the analytics engine 307 also includes failure data or codes, indicative of the cause of the failure or the step of the process where the result converged to null. For instance, if the generated list did not survive filtration, then remediation actions instituted by the OSS may be different than if the null result was achieved on another step of the process.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method of operating a distributed architecture network comprising a Converged Cable Access Platform (CCAP)-compliant hybrid fiber coax (HFC) network, at least one Remote PHY Device (RPD) for communication with one or more user devices, and at least one CCAP Core, the at least one RPD and the at least one CCAP Core in data communication via at least a Generic Control Plane (GCP) interface, the method comprising:
   identifying at least one RPD;
   obtaining data from the at least one RPD, the obtaining comprising using the GCP interface to receive at least a portion of the data from an installer process operative to run on a mobile device situated proximate the at least one RPD, the at least one RPD having been installed in the network and being previously unknown to the network;
   providing the obtained data to a computerized analytics process;
   based at least on (i) the provided obtained data, and (ii) data relating to one or more network operational policies, calculating an allocation of the at least one RPD to the at least CCAP core entity; and
   based at least on the calculated allocation, causing the at least one RPD to associate with the at least one CCAP core during operation of the distributed architecture network.

2. The method of claim 1, wherein, the at least one RPD comprises a plurality of RPDs, and the causing the at least one remote entity to associate with the at least one core entity during operation of the distributed architecture network comprises:
   writing a plurality of configuration data to respective ones of the plurality of RPDs via the at least one CCAP Core; and
   causing re-initialization of the plurality of RPDs, the re-initialization causing each respective RPD to utilize its respective configuration data to effect re-assignment to its respective at least one associated core entity.

3. The method of claim 1, wherein the causing the at least one remote entity to associate with the at least one core entity during operation of the distributed architecture network comprises causing the at least one remote entity to be redirected to the at least one core entity after initialization of the at least one core entity after installation, the at least one core entity comprising an operational core which is not a default core.

4. The method of claim 1, further comprising:
   receiving from the at least one remote entity a request for initialization;
   in response to the receiving of the request, generating at least one protocol message, the at least one protocol message comprising data indicative of a default entity to which the at least one remote entity is to initially contact for said initialization; and
   transmitting to the at least one remote entity, via the at least one protocol message, the data indicative of a default entity.

5. The method of claim 4, wherein the protocol message comprises a DHCP (dynamic host control protocol) response message, and the data comprises Suboption 61.

6. The method of claim 5, wherein the default entity comprises an enhanced CCAP Core (eCore).

7. Computer readable apparatus comprising at least one storage medium, the at least one storage medium comprising at least one computer program, the at least one computer program comprising a plurality of instructions which, when executed on a computerized device:
- obtain a first plurality of data relating to a plurality of CCAP (Converged Cable Access Platform) remote physical layer devices (RPDs) within a distributed architecture hybrid fiber coax (HFC) digital network by receiving at least a portion of the first data from an installer process operative to run on a mobile device situated proximate one of the remote physical layer devices, the one remote physical layer device having been installed in the network and being previously unknown to the network, the plurality of first data received via at least a Generic Control Plane (GCP) interface;
- obtain a second plurality of data relating to a plurality of CCAP core entities within the distributed architecture digital network;
- execute at least one algorithm to process the first data and the second data, and third data relating to one or more network configuration rules or requirements, to calculate a topology for the distributed architecture HFC digital network; and
- cause allocation of at least a portion of the plurality of RPDs to respective one or more of the plurality of CCAP core entities based on the calculated topology.

8. The computer readable apparatus of claim 7, wherein the causation of allocation comprises:
- writing a plurality of configuration data to respective ones of the at least portion of the plurality of RPDs via a core entity of the network; and
- causing re-initialization of the at least portion of the plurality of RPDs, the re-initialization causing each respective RPD of the at least portion to utilize its respective configuration data to effect re-assignment to its respective one or more CCAP core entities.

9. A method of processing an initialization request within a CCAP (Converged Cable Access Platform) core entity of a distributed architecture hybrid fiber coax (HFC) digital network, the method comprising:
- receiving an initialization message from a remote physical device (RPD) within the distributed architecture HFC digital network, the RPD having been previously installed in the HFC digital network and known thereto;
- authenticating at least the RPD;
- establishing a communication interface between the RPD and the CCAP core entity via at least a Generic Control Plane (GCP) interface;
- determining a first status of the RPD;
- based on the determination of the first status, causing the RPD to use the CCAP core entity as its operational core;
- notifying an installation process of the availability of the RPD for configuration, the installation process operative to run on a mobile device situated geographically or topologically proximate the RPD;
- receiving data from the installation process relating to a configuration of the RPD;
- using the received data to remotely configure the RPD;
- designate the RPD as available for redirection to another CCAP core entity within the network; and
- causing re-initialization of the RPD, the re-initialization causing the RPD to utilize the another CCAP core entity as its operational core.

10. The method of claim 9, wherein:
- the receiving an initialization message from the RPD comprises receiving an RPD authentication request message initiated from the RPD; and
- the determining a first status comprises receiving an RPD Notify message initiated from the RPD.

11. The method of claim 10, wherein the notifying an installation process of the availability of the RPD for configuration comprises transmitting a message to an application computer program, the transmitted message configured to cause transmission of the data from the installation process relating to the configuration of the RPD.

12. The method of claim 11, wherein the application computer program comprises a client portion of a distributed application, the client portion operative to run on the RPD, and configured to automatically cause transmission of the data from the client portion relating to the configuration of the RPD to a corresponding server portion of the distributed application operative on the CCAP core entity.

13. A method of operating a distributed architecture HFC (hybrid fiber coax) network, comprising:
- receiving from a plurality of remote physical layer devices (RPDs) a plurality of respective requests for initialization, each of the plurality of RPDs having been previously installed within the HFC network and known to at least one computerized process therein;
- in response to the receiving of at least one of the respective requests, generating at least one protocol message, the at least one protocol message comprising first data indicative of a default CCAP (Converged Cable Access Platform) core entity to which the plurality of RPDs are to initially contact for said initialization;
- transmitting to the plurality of RPDs, via the at least one protocol message and at least a Generic Control Plane (GCP) interface, the first data indicative of the default entity;
- receiving second data from an installer process operative to run on a mobile device in data communication with at least one of the plurality of RPDs;
- causing writing a plurality of configuration data to respective ones of the plurality of RPDs via at least the default CCAP core entity; and
- causing re-initialization of the plurality of RPDs, the re-initialization causing each respective RPD to utilize its respective configuration data to effect re-assignment to a respective at least one associated core entity during operation of the distributed architecture network.

14. The method of claim 13, wherein the protocol message comprises a DHCP (dynamic host control protocol) response message, and the first data comprises Suboption 61.

15. The method of claim 13, wherein the default entity comprises an enhanced CCAP Core (eCore).

* * * * *